US011252306B2

(12) United States Patent
Yang et al.

(10) Patent No.: US 11,252,306 B2
(45) Date of Patent: Feb. 15, 2022

(54) METHOD FOR GENERATING DEPTH INFORMATION AND ELECTRONIC DEVICE SUPPORTING THE SAME

(71) Applicant: Samsung Electronics Co., Ltd., Suwon-si (KR)

(72) Inventors: Kyungdong Yang, Suwon-si (KR); Jaehyoung Park, Suwon-si (KR); Yungmok Yu, Suwon-si (KR); Dongbum Choi, Suwon-si (KR); Jonghun Won, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/386,855

(22) Filed: Apr. 17, 2019

(65) Prior Publication Data

US 2019/0327393 A1    Oct. 24, 2019

(30) Foreign Application Priority Data

Apr. 19, 2018    (KR) .................. 10-2018-0045633

(51) Int. Cl.
*H04N 5/222*    (2006.01)
*H04N 5/225*    (2006.01)
*G06T 7/593*    (2017.01)

(52) U.S. Cl.
CPC .......... *H04N 5/2226* (2013.01); *G06T 7/593* (2017.01); *H04N 5/2258* (2013.01)

(58) Field of Classification Search
None
See application file for complete search history.

(56) References Cited

U.S. PATENT DOCUMENTS 8,199,248 B2    6/2012 Li et al.
8,340,456 B1    12/2012 Daneshpanah et al.
(Continued)

FOREIGN PATENT DOCUMENTS

CN    101795361 A    8/2010
CN    102997891 A    3/2013
(Continued)

OTHER PUBLICATIONS

International Search Report with Written Opinion dated Aug. 13, 2019; International Appln. No. PCT/KR2019/004662.
(Continued)

*Primary Examiner* — Chikaodili E Anyikire
(74) *Attorney, Agent, or Firm* — Jefferson IP Law, LLP

(57) ABSTRACT

An electronic device is provided. The electronic device includes a first camera, a second camera spaced apart from the first camera, and a processor. The processor is configured to obtain a first image of external objects using the first camera, obtain a second image of the external objects using the second camera, identify a specified object in which pieces of depth information are generated from among the external objects included in the first image and the second image based on phase difference comparison between the first image and the second image, then select depth information about the specified object among the pieces of depth information based on a degree of spreading of a point corresponding to the specified object included in at least one of the first image and the second image, and generate depth information about the external objects including the specified object using the selected depth information.

18 Claims, 11 Drawing Sheets

(56) References Cited

U.S. PATENT DOCUMENTS

| | | | |
|---|---|---|---|
| 8,558,873 B2 | 10/2013 | McEldowney | |
| 8,705,801 B2 | 4/2014 | Kawamura et al. | |
| 8,737,756 B2 | 5/2014 | Daneshpanah et al. | |
| 9,445,003 B1* | 9/2016 | Lelescu | H04N 5/23232 |
| 9,807,297 B2* | 10/2017 | Ikemoto | G06T 5/003 |
| 9,832,456 B2* | 11/2017 | Wan | G06T 7/593 |
| 9,836,855 B2 | 12/2017 | Morgan-Mar et al. | |
| 9,955,070 B2 | 4/2018 | Lelescu et al. | |
| 10,070,121 B2 | 9/2018 | Boufarguine | |
| 10,291,839 B2 | 5/2019 | Kato | |
| 10,331,977 B2* | 6/2019 | Hornung | G06T 7/521 |
| 10,547,786 B2* | 1/2020 | Pan | H04N 5/23267 |
| 10,791,313 B2* | 9/2020 | Yun | H04N 13/117 |
| 2010/0194971 A1 | 8/2010 | Li et al. | |
| 2011/0310226 A1* | 12/2011 | McEldowney | G06F 3/0325 |
| | | | 348/46 |
| 2012/0148109 A1* | 6/2012 | Kawamura | H04N 5/23212 |
| | | | 382/106 |
| 2012/0287447 A1 | 11/2012 | Zomet | |
| 2012/0288184 A1 | 11/2012 | Zomet | |
| 2013/0063566 A1* | 3/2013 | Morgan-Mar | G06T 7/571 |
| | | | 348/46 |
| 2013/0141538 A1 | 6/2013 | Daneshpanah et al. | |
| 2016/0054890 A1 | 2/2016 | Kim | |
| 2016/0182893 A1 | 6/2016 | Wan | |
| 2016/0189358 A1 | 6/2016 | Boufarguine | |
| 2016/0255334 A1* | 9/2016 | Wajs | G06T 7/571 |
| | | | 382/154 |
| 2017/0070673 A1 | 3/2017 | Lelescu et al. | |
| 2017/0322023 A1* | 11/2017 | Ikemoto | H04N 5/3696 |
| 2017/0345176 A1* | 11/2017 | Choi | G02B 5/09 |
| 2017/0353654 A1 | 12/2017 | Kato | |
| 2018/0302554 A1 | 10/2018 | Lelescu et al. | |

FOREIGN PATENT DOCUMENTS

| | | |
|---|---|---|
| JP | 2013-517657 A | 5/2013 |
| JP | 2016-128810 A | 7/2016 |
| KR | 10-2015-0109994 A | 10/2015 |

OTHER PUBLICATIONS

European Search Report dated May 3, 2021, issued in European Application No. 19788481.0.
Chinese Office Action dated Dec. 13, 2021, issued in Chinese Application No. 201980026555.4.

* cited by examiner

METHOD FOR GENERATING DEPTH INFORMATION AND ELECTRONIC DEVICE SUPPORTING THE SAME

CROSS-REFERENCE TO RELATED APPLICATION(S)

This application is based on and claims priority under 35 U.S.C. § 119(a) of a Korean patent application number 10-2018-0045633, filed on Apr. 19, 2018, in the Korean Intellectual Property Office, the disclosure of which is incorporated by reference herein in its entirety.

BACKGROUND

1. Field

The disclosure relates to a technology for generating depth information by using images, the view point of each of which is different.

2. Description of Related Art

An electronic device may provide various services based on first and second images obtained using a dual camera. For example, an electronic device may generate depth information based on the phase difference between the first image (e.g., the image of the left camera) and the second image (e.g., the image of the right camera) obtained from the dual camera.

According to the phase difference calculation technology (e.g., security association database (SAD), solid state drive (SSD) and CENSUS algorithms), an electronic device may calculate the phase difference cost between the first region of the first image and the candidate region of the second image corresponding to the first region, may calculate the phase difference between the first region and the candidate region with the lowest phase difference cost, and may calculate depth information about an object included in first and second images, based on the phase difference.

However, when the stereo image includes a repeating pattern or a region with a high spatial frequency, a plurality of candidate regions of the second image corresponding to the first region of the first image may be calculated and thus, it may fail to generate depth information based on the phase difference.

The above information is presented as background information only, and to assist with an understanding of the disclosure. No determination has been made, and no assertion is made, as to whether any of the above might be applicable as prior art with regard to the disclosure.

SUMMARY

Aspects of the disclosure are provided to address at least the above-mentioned problems and/or disadvantages, and to provide at least the advantages described below. Accordingly, an aspect of the disclosure is to provide a method of generating depth information using a depth from a defocus (DFD) operation when the depth information cannot be calculated based on the phase difference of a stereo image, and an electronic device supporting the same.

Additional aspects will be set forth in part in the description which follows and, in part, will be apparent from the description, or may be learned by practice of the presented embodiments.

In accordance with an aspect of the disclosure, an electronic device is provided. The electronic device includes a first camera disposed on one surface of the electronic device, a second camera disposed on the one surface while being space apart from the first camera by a specified interval, and at least one processor. The processor is configured to obtain a first image of one or more external objects using the first camera, obtain a second image of the one or more external objects using the second camera, identify a specified object in which pieces of depth information are generated from among the one or more external objects included in the first image and the second image based on a phase difference comparison between the first image and the second image, and select depth information about the specified object among the pieces of depth information based on a degree of spreading of a point corresponding to the specified object included in at least one of the first image and the second image, and generate depth information about the one or more external objects including the specified object using the selected depth information.

In accordance with another aspect of the disclosure, an electronic device is provided. The electronic device includes a camera, a memory, and at least one processor. The camera includes a first group of pixels and a second group of pixels per pixel, and the at least one processor is configured to obtain a first image of one or more external objects using the first group of pixels of the camera, obtain a second image of the one or more external objects using the second group of pixels of the camera, identify a specified object in which pieces of depth information are generated from among the one or more external objects included in the first image and the second image based on a phase difference comparison between the first image and the second image, and select depth information about the specified object among the pieces of depth information based on a degree of spreading of a point of the specified object included in at least one of the first image and the second image.

In accordance with another aspect of the disclosure, a depth information generating method of an electronic device is provided. The depth information generating method includes obtaining a first image and a second image of one or more external objects using at least one camera, identifying a specified object in which pieces of depth information are generated from among the one or more external objects included in the first image and the second image based on phase difference comparison between the first image and the second image, selecting depth information about the specified object among the pieces of depth information based on a degree of spreading of a point corresponding to the specified object included in at least one image of the first image and the second image, and generating depth information about the one or more external objects including the specified object using the selected depth information. The first image and the second image have at least a phase difference of the one or more external objects.

Other aspects, advantages, and salient features of the disclosure will become apparent to those skilled in the art from the following detailed description, which, taken in conjunction with the annexed drawings, discloses embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
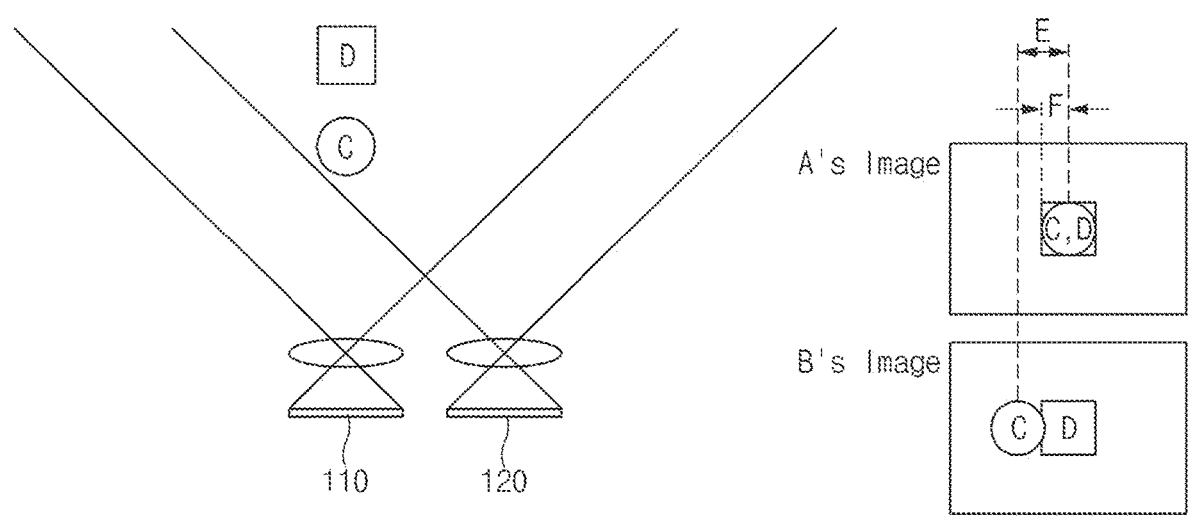
FIG. 1 is a view for describing a method of calculating depth information from an image obtained using a dual camera according to an embodiment of the disclosure.

The following description with reference to the accompanying drawings is provided to assist in a comprehensive understanding of embodiments of the disclosure as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used to enable a clear and consistent understanding of the disclosure. Accordingly, it should be apparent to those skilled in the art that the following description of embodiments of the disclosure is provided for illustration purpose only, and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, the expressions "have", "may have", "include" and "comprise", or "may include" and "may comprise" used herein indicate existence of corresponding features (e.g., components such as numeric values, functions, operations, or parts), but do not exclude the presence of additional features.

In the disclosure, the expressions "A or B", "at least one of A or/and B", or "one or more of A or/and B", and the like, may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there is no intervening component (e.g., a third component).

According to the situation, the expression "configured to" used in the disclosure may be used as, for example, the expression "suitable for", "having the capacity to", "designed to", "adapted to", "made to", or "capable of". The term "configured to" does not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor (AP)) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal manner unless expressly so defined in embodiments of the disclosure. In some cases, even if terms are terms which are defined in the disclosure, they may not be interpreted to exclude embodiments of the disclosure.

An electronic device according to embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), Motion Picture Experts Group phase 1 or phase 2 (MPEG-1 or MPEG-2) audio layer 3 (MP3) players, mobile medical devices, cameras, or wearable devices. According to embodiments of the disclosure, the wearable device may include at least one of an accessory type (e.g., watches, rings, bracelets, anklets, necklaces, glasses, contact lens, or head-mounted-devices (HMDs), a fabric or garment-integrated type (e.g., electronic apparel), a body-attached type (e.g., a skin pad or tattoos), or a bio-implantable type (e.g., an implantable circuit).

According to embodiments of the disclosure, the electronic device may be a home appliance. The home appliances may include at least one of, for example, televisions (TVs), digital versatile disc (DVD) players, audios, refrigerators, air conditioners, cleaners, ovens, microwave ovens, washing machines, air cleaners, set-top boxes, home automation control panels, security control panels, TV boxes (e.g., Samsung HomeSync™, Apple TV™, or Google TV™), game consoles (e.g., Xbox™ or PlayStation™), electronic dictionaries, electronic keys, camcorders, electronic picture frames, and the like.

According to another embodiment, an electronic device may include at least one of various medical devices (e.g., various portable medical measurement devices (e.g., a blood glucose monitoring device, a heartbeat measuring device, a blood pressure measuring device, a body temperature measuring device, and the like), a magnetic resonance angiography (MRA), a magnetic resonance imaging (MRI), computed tomography (CT), scanners, and ultrasonic devices), navigation devices, global navigation satellite system (GNSS), event data recorders (EDRs), flight data recorders (FDRs), vehicle infotainment devices, electronic equipment for vessels (e.g., navigation systems and gyrocompasses), avionics, security devices, head units for vehicles, industrial or home robots, automated teller machines (ATMs), points of sales (POSs) of stores, or internet of things (e.g., light bulbs, various sensors, electric or gas meters, sprinkler devices, fire alarms, thermostats, street lamps, toasters, exercise equipment, hot water tanks, heaters, boilers, and the like).

According to an embodiment, the electronic device may include at least one of parts of furniture or buildings/structures, electronic boards, electronic signature receiving devices, projectors, or various measuring instruments (e.g., water meters, electricity meters, gas meters, or wave meters, and the like). According to embodiments of the disclosure, the electronic device may be one of the above-described devices or a combination thereof. An electronic device according to an embodiment may be a flexible electronic device. Furthermore, an electronic device according to an embodiment of the disclosure may not be limited to the above-described electronic devices and may include other electronic devices and new electronic devices according to the development of technologies.

Hereinafter, electronic devices according to embodiments of the disclosure will be described with reference to the accompanying drawings. In the disclosure, the term "user" may refer to a person who uses an electronic device or may refer to a device (e.g., an artificial intelligence electronic device) that uses the electronic device.

FIG. 1 is a view for describing a method of calculating depth information from an image obtained using a dual camera according to an embodiment of the disclosure.

Referring to FIG. 1, when an object 'C' and an object 'D' are respectively included in the angle of view of a first camera 110 and in the angle of view of a second camera 120, the first camera 110 may capture a first image (A's image) including the object 'C' and the object 'D', and the second camera 120 may capture a second image (B's image) including object 'C' and object 'D'. Because the first camera 110 and the second camera 120 are spaced apart by a specified distance, the coordinate value of the first region including the object 'C' and the object 'D' in the first image may be different from the coordinate value of the second region including the object 'C' and the object 'D' in the second image, due to the parallax between the first camera 110 and the second camera 120. When stereo vision technology is applied to the first and second images, the disparity (e.g., E, F) between the first region of the first image and the second region of the second image may be calculated. This disparity may vary depending on the distance between the first and second cameras 110 and 120 and an external object (e.g., subject). For example, in the case of an external object close to the first and second cameras 110 and 120, the disparity may increase; in the case of an external object spaced apart from the first and second cameras 110 and 120, the disparity may decrease. When the distance from the external object according to the amount of disparity is stored in advance, depth information (e.g., depth map) may be generated using the disparity.

According to an embodiment, the optical axis of the first camera 110 and the optical axis of the second camera 120 may be parallel to each other and may be tilted toward a point between the first camera 110 and the second camera 120. An embodiment is exemplified in FIG. 1 as the optical axis of the first camera 110 and the optical axis of the second camera 120 are parallel to each other.

Figure 2:
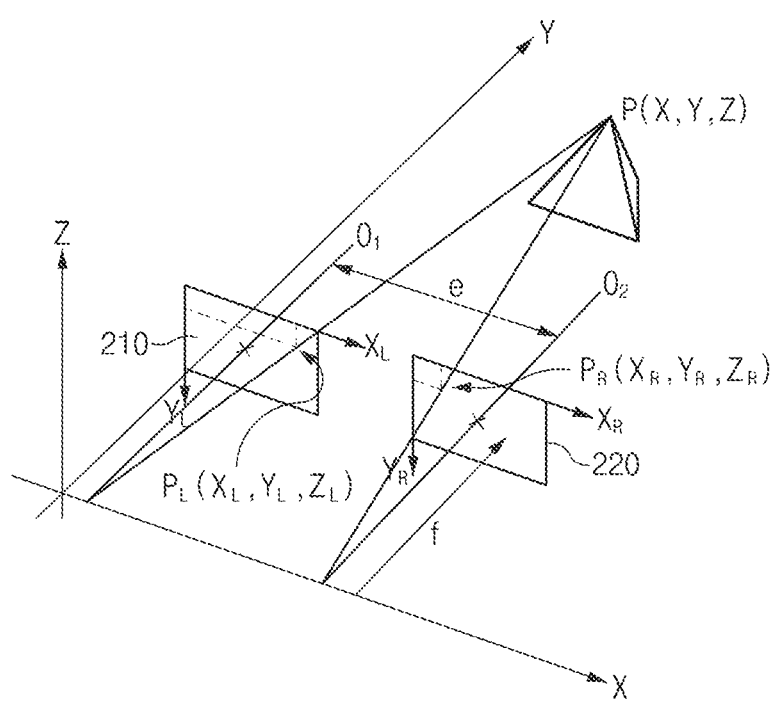
FIG. 2 is a view for describing a method of detecting a phase difference according to an embodiment of the disclosure.

FIG. 2 is a view for describing a method of detecting a phase difference according to an embodiment of the disclosure.

Referring to FIG. 2, an object at point 'P' may be imaged on the image plane of the first image sensor (hereinafter referred to as a 'first image plane' 210) and an image plane of the second image sensor (hereinafter referred to as a 'second image plane' 220) differently from each other, due to a spaced distance 'e' between the first image sensor and the second image sensor. For example, point 'P' may be imaged on a location of $P_L(X_L, Y_L, Z_L)$ in the first image plane 210; and point 'P' may be imaged on the location of $P_R(X_R, Y_R, Z_R)$ in the second image plane 220. The difference between the location of point 'P' imaged on the first image plane 210 and the location of point 'P' imaged on the second image plane 220 may be used to calculate the depth information. For example, when the difference between the first image obtained via the first image sensor and the second image is identified through epipolar geometry, depth information 'z' may be calculated as in Equation 1 below. For example, the epipolar geometry may be geometry for the location relationship of images captured at different angles using two cameras.

$$z = \frac{fSe}{pS\delta} \qquad \text{Equation 1}$$

In Equation 1, 'f' may denote the focal distance of each of the lens of the first camera (e.g., the first camera 110 of FIG. 1) and the lens of the second camera (e.g., the second camera 120 of FIG. 1); 'e' may denote the distance between the center $0_1$ of the first image sensor and the center $0_2$ of the second image sensor; 'P' may denote the width of each of the pixels of the first and second image sensors; and '$\delta$' may denote the disparity of a feature point (e.g., 'P'). The depth information (z, the distance of an object) calculated through Equation 1 may be composed of a depth map.

Figure 3:
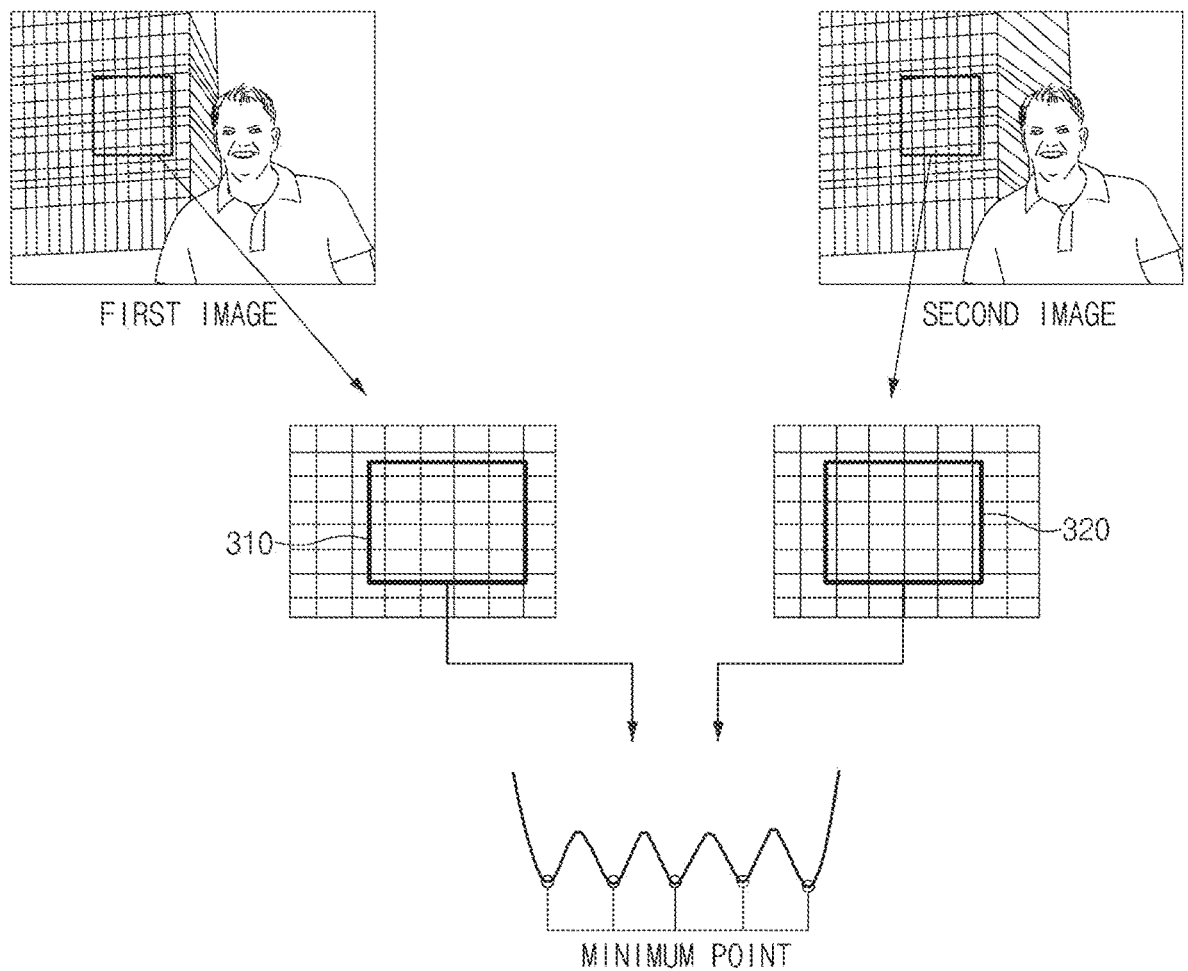
FIG. 3 is a view for describing an error of phase difference-based depth information calculation according to an embodiment of the disclosure.

FIG. 3 is a view for describing an error of phase difference-based depth information calculation according to an embodiment of the disclosure.

Referring to FIG. 3, according to the technology of calculating the phase difference-based depth information, the electronic device may calculate the correlation operation cost (or phase difference cost) between the specific location of the first image and the candidate location of the second image corresponding to the specific location of the first image to determine the disparity of the same feature point, may determine the minimum point of the calculated correlation operation cost, and may calculate the disparity based on the determined minimum point. When the first image and the second image include repeated patterns 310 and 320, or include a subject with a high spatial frequency, the correlation operation cost of a feature point may include a plurality of minimum points. For example, as illustrated in FIG. 3, at least some objects of the external objects included in the first and second images may include repeated patterns 310 and 320. In this case, the correlation operation cost of the at least some objects may include a plurality of minimum points, and the depth information about the at least some objects may not be calculated accurately.

Figure 4:
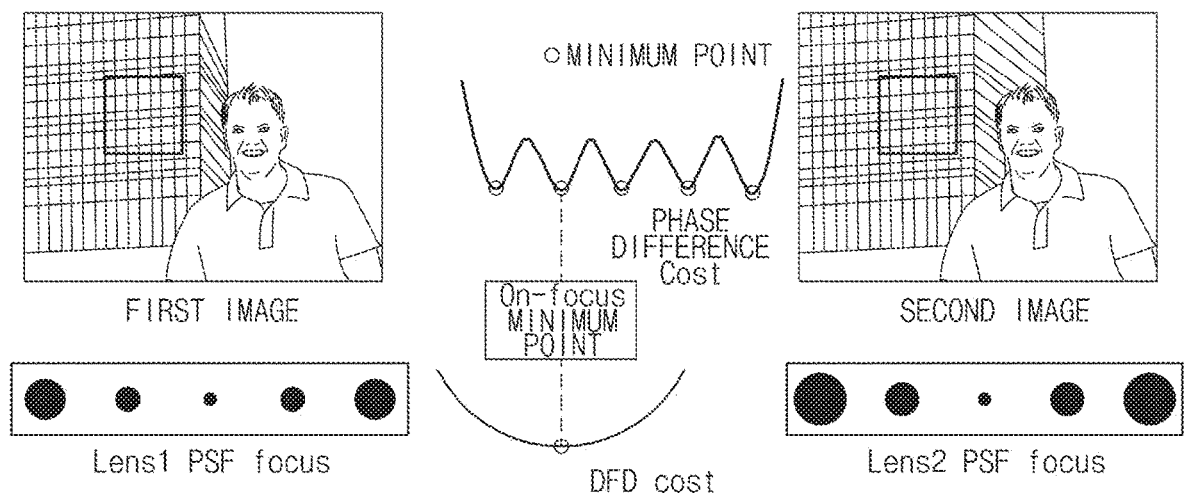
FIG. 4 is an example in which a phase difference-based depth information calculation method and a depth from defocus (DFD)-based depth information calculation method are mixed according to an embodiment of the disclosure.

FIG. 4 is an example in which a phase difference-based depth information calculation method and a depth from defocus (DFD)-based depth information calculation method are mixed according to an embodiment of the disclosure.

Referring to FIG. 4, in the process of calculating phase difference-based disparity, the correlation operation cost of at least some objects may include a plurality of minimum points. In this case, an electronic device may calculate depth information of at least some objects among the depth information corresponding to a plurality of minimum points through DFD operation using a first image and Lens1 PSF focus, and a second image and Lens 2 PSF focus. According to the above-described embodiment, an electronic device may improve the error of the depth information calculated based on the phase difference.

Figure 5:
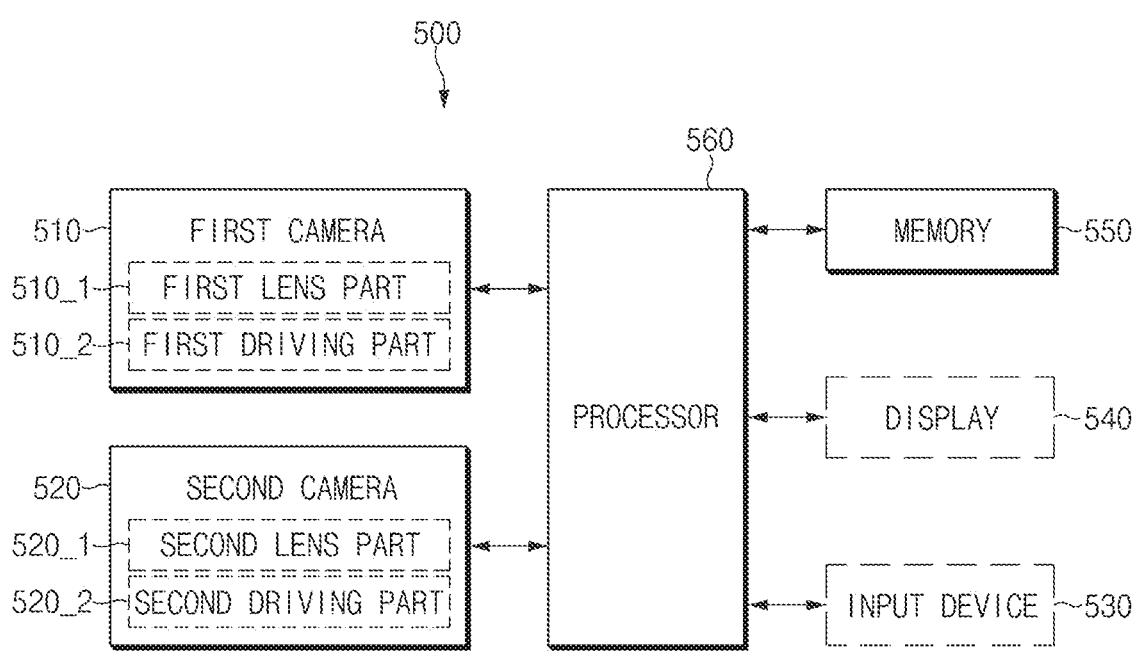
FIG. 5 is a block diagram of an electronic device according to an embodiment of the disclosure.

FIG. 5 is a block diagram of an electronic device according to an embodiment of the disclosure.

Referring to FIG. 5, an electronic device 500 may include a first camera 510, a second camera 520, a memory 550, and at least one processor 560. In an embodiment, the electronic device 500 may not include some of the above components or may include additional components. For example, the electronic device 500 may further include at least one of an input device 530 and a display 540. In an embodiment, some components of the electronic device 500 may be combined to form one entity, which may identically perform functions of the corresponding components before the combination.

The first camera 510 may photograph a still image and a video. According to an embodiment, the first camera 510 may include a first lens part 510_1, a first driving part 510_2, a first image sensor, and a first image signal processor (ISP) (not shown). The first lens part 510_1 may be configured to have a first angle of view and a first focal distance. The first image sensor may obtain a first image corresponding to one or more external objects (e.g., subject) by converting the light transmitted from one or more external objects through the first lens part 510_1 into an electrical signal. The image obtained using the first image sensor due to the attribute of the first lens part 510_1 may be an image that is in focus at the first field of view (FOV). The first image sensor may be implemented with a charged coupled device (CCD) sensor or a complementary metal oxide semiconductor (CMOS) sensor. The first driving part 510_2 may adjust the location of the first lens part 510_1 under the control of the first ISP or the processor 560.

The second camera 520 may photograph a still image and a video. According to an embodiment, the second camera 520 may include a second lens part 520_1, a second driving part 520_2, a second image sensor, and a second ISP (not shown). The second lens part 520_1 may be configured to have a second angle of view and a second focal distance. The second image sensor may obtain a second image corresponding to one or more external objects (e.g., subject) by converting the light transmitted from one or more external objects through the second lens part 520_1 into an electrical signal. The image obtained using the second image sensor due to the attribute of the second lens part 520_1 may be an image that is in focus at the second FOV. The second image sensor may be implemented with a CCD sensor or a CMOS sensor. The second driving part 520_2 may adjust the location of the second lens part 520_1 under the control of the second ISP or the processor 560.

According to an embodiment, both the first camera 510 and the second camera 520 may be disposed toward one side (e.g., the front plate) of the electronic device 500. For example, the second camera 520 may be disposed on one side of the electronic device 500 while being spaced apart from the first camera 510 by a specified interval. The first focal distance and the second focal distance may be the same for each camera. Alternatively, the first focal distance and the second focal distance may be different for each camera. For example, the first camera 510 may be a wide-angle camera, and the second camera 520 may be a telephoto camera.

According to an embodiment, the input device 530 may detect or receive a user input. For example, the input device 530 may include at least one of a mechanical button or a touch sensor, and the touch sensor may be integrated with the display 540.

The display 540 may display, for example, various kinds of content (e.g., a text, an image, a video, an icon, and/or a symbol). The display 540 may include, for example, a liquid crystal display (LCD), a light-emitting diode (LED) display, an organic LED (OLED) display, or an electronic paper display. For example, the display 540 may be a touch screen display.

The memory 550 may store instructions or data associated with at least one other component(s) of the electronic device 500. The memory 550 may be a volatile memory (e.g., a random access memory (RAM) or the like), a nonvolatile memory (e.g., a read only memory (ROM), a flash memory, or the like), or a combination thereof. According to an embodiment, the memory 550 may also store phase difference reference data for generating depth information using a phase difference (or disparity). The memory 550 may also include a first point spread function corresponding to the first camera 510 and a second point spread function corresponding to the second camera 520. The first point spread function may be a function associated with a plurality of degrees of spreading of the first point corresponding to the first camera 510. The plurality of degrees of spreading of the first point may further include depth relationship information about changes in the degree of spreading of a point according to the change of at least part of a distance between the electronic device 500 and the external object.

For example, the plurality of degrees of spreading of the first point may include the degree of spreading of a point obtained from the image that is imaged by the image sensor of the first camera 510 while the distance of the external object (e.g., the light source) is fixed to one side of the electronic device 500, and the location of the first lens part 510_1 is moved using the first driving part 510_2 along the optical axis from a location closest to the external object to a location farthest from the external object.

As another example, the plurality of degrees of spreading of the first point may include the degree of spreading of a point obtained from the image that is imaged by the image sensor of the first camera 510 while the location of the first lens part 510_1 is fixed using the first driving part 510_2, and the distance of the external object (e.g., the light source) from one side of the electronic device 500 is changed.

As still another example, the plurality of degrees of spreading of the first point may be obtained as the distance of the external object to one side of the electronic device 500 and the location of the first lens part 510_1 are fixed, and a part of the characteristics of the optical system of the first camera 510 is changed. The second point spread function may be a function associated with a plurality of degrees of spreading of the second reference point corresponding to the second camera 520. The plurality of degrees of spreading of the second point may further include depth relationship information about changes in the degree of spreading of a point according to the change of at least part of a distance between the electronic device 500 and the external object. For example, the plurality of degrees of spreading of the second point may include the degree of spreading of a point obtained from the image that is imaged by the image sensor of the second camera 520 while the distance of the external object (e.g., the light source) is fixed to one side of the electronic device 500, and the location of the second lens part 520_1 is moved using the second driving part 520_2 along the optical axis from a location closest to the external object to a location farthest from the external object. The plurality of degrees of spreading of the second point may include the degree of spreading of a point obtained from the image that is imaged by the image sensor of the second camera 520 while the location of the second lens part 520_1 is fixed using the second driving part 520_2, and the distance of the external object (e.g., the light source) to one side of the electronic device 500 is changed.

As still another example, the plurality of degrees of spreading of the second point may be obtained as the distance of the external object to one side of the electronic device 500 and the location of the second lens part 520_1 are fixed, and a part of the characteristics of the optical system of the second camera 520 is changed.

The processor 560 may perform data processing or an operation associated with a control and/or a communication of at least one other component(s) of the electronic device 500 by using instructions stored in the memory 550. For example, the processor 560 may include at least one of a CPU, a graphics processing unit (GPU), a microprocessor, an AP, an application specific integrated circuit (ASIC), a field programmable gate array (FPGA), or an ISP, and may have a plurality of cores.

According to an embodiment, when an input of a user to instruct shooting using the first camera 510 and the second camera 520 is received via the input device 530, the processor 560 may obtain a first image of one or more external objects by using the first camera 510 and may obtain a second image for one or more external objects by using the second camera 520.

According to an embodiment, the processor 560 may generate depth information about at least some objects of the one or more external objects based on the phase difference comparison between the first image and the second image.

For example, in the process of calculating the disparity between the first image and the second image using the specified stereo matching method, the processor 560 may calculate the phase difference (or disparity) of at least some objects among one or more external objects. The specified stereo matching method may include at least one of solid state drive (SSD), security association database (SAD), and CENSUS schemes. As another example, the processor 560 may select one or more external objects that are included in the first image and the second image in common, and may calculate the phase difference of at least part of each selected external object. The processor 560 may generate depth information from the phase difference calculated based on the phase difference reference data.

According to an embodiment, while generating depth information based on the phase difference comparison between the first image and the second image, the processor 560 may identify the specified object in which pieces of depth information are generated from among the one or more external objects (subject) included in the first image and the second image. When identifying the specified object, the processor 560 may select depth information about the specified object among the pieces of depth information based on the degree of spreading of a point for the specified object included in at least one image of the first image and the second image and may generate depth information about the one or more external objects including the specified object by using the selected depth information.

According to an embodiment, when the first image and the second image are focused on the same object among one or more external objects and a specified object, in which pieces of depth information are generated, among the one or more external objects is present, the processor 560 may select a part of depth information about a specified object among the pieces of depth information by at least using the degree of spreading of a point, which corresponds to a specified object included in the first image, from among a plurality of degrees of spreading of the first point, and degrees of spreading of a point, which corresponds to a specified object included in the second image, from among a plurality of degrees of spreading of a second point.

For example, the processor 560 may identify first similarity (or correlation) (e.g., difference value) between the plurality of degrees of spreading of the first point and the characteristics of the specified object included in the first image and second similarity between the plurality of degrees of spreading of the second point and the characteristics of the specified object included in the second image, and may select the part of depth information among the pieces of depth information by using the first similarity and the second similarity. Referring to Equation 2 and Equation 3 described below, the processor 560 may extract a first region including a specified object among the whole region of the first image and may identify the characteristic F1 of the extracted first region. For example, the characteristic F1 of the first region may be the data obtained by converting the image of the first region into the frequency domain. The processor 560 may extract a second region including a specified object among the whole region of the second image and may identify the characteristic F2 of the extracted second region. The processor 560 may estimate unblurred image data ($\widetilde{F_G}$) as illustrated in Equation 2, using the d-th degree K1(d) of spreading of the first point, which has the same defocus distance (d, 1≤d≤n, 'n' corresponds to the number of movable locations of the first lens part 510_1) among a plurality of degrees of spreading of the first point and a plurality of degrees of spreading of the second point, the d-th degree K2(d) of spreading of the second point having the same defocus distance, the characteristic F1 of the first region, and the characteristic F2 of the second region. The processor 560 may calculate the cost (Cost(d)) of the DFD operation as illustrated in Equation 3, using the first similarity ($|\widehat{F_G} K_1(d) - F_1|^2$) corresponding to the square of the result of subtracting the characteristic F1 of the first region from a value from multiplying the estimated image data ($\widehat{F_G}$) and the d-th degree K1(d) of spreading of the first point and the second similarity ($|\widehat{F_G} K_2(d) - F_2|^2$) corresponding to the square of the result of subtracting the characteristic F2 of the second region from a value from multiplying the estimated image data ($\widehat{F_G}$) and the d-th degree K2(d) of spreading of the second point.

$$\widehat{F_G} = \frac{F_1 \overline{K_1(d)} + F_2 \overline{K_2(d)}}{|K_1(d)|^2 + |K_2(d)|^2} \quad \text{Equation 2}$$

$$\text{Cost}(d) = \underset{d}{\operatorname{argmin}}[|\widehat{F_G} K_1(d) - F_1|^2 + |\widehat{F_G} K_2(d) - F_2|^2] \quad \text{Equation 3}$$

The processor 560 may identify the defocus distance (depth relationship information) of the degree of spreading of a point corresponding to the order, in which the calculated cost is lowest, and may determine the depth information about the specified object by using the identified defocus distance (the distance to the focus location).

As another example, the plurality of degrees of spreading of a first point may include the first degree of spreading of the first point (having a first defocus distance) and the second degree of spreading of the first point (having a second defocus distance). The plurality of degrees of spreading of a second point may include the first degree of spreading of the second point (having the first defocus distance) and the second degree of spreading of the second point (corresponding to the second defocus distance). The processor 560 may estimate unblurred image data ($\widehat{F_G}$) corresponding to the first defocus distance as illustrated Equation 2, using the degree K1(1) of spreading of the first point having the first defocus distance and the degree K2(1) of spreading of the second point having the first defocus distance, the characteristic F1 of the first region, and the characteristic F2 of the second region. The processor 560 may calculate the cost (Cost(1)) of the DFD operation corresponding to the first defocus distance as illustrated in Equation 3, using the first similarity ($|\widehat{F_G} K_1(1) - F_1|^2$) corresponding to the square of the result of subtracting the characteristic F1 of the first region from a value from multiplying the estimated image data ($\widehat{F_G}$) and the degree K1(1) of spreading of the first point having the first defocus distance and the second similarity ($|\widehat{F_G} K_2(1) - F_2|^2$) corresponding to the square of the result of subtracting the characteristic F2 of the second region from a value from multiplying the estimated image data ($\widehat{F_G}$) and the degree K2(1) of spreading of the second point having the first defocus distance. The processor 560 may estimate unblurred image data ($\widehat{F_G}$) corresponding to the second defocus distance as illustrated Equation 2, using the degree K1(2) of spreading of the first point having the second defocus distance, the degree K2(2) of spreading of the second point having the second defocus distance, the characteristic F1 of the first region, and the characteristic F2 of the second region. The processor 560 may calculate the cost (Cost (2)) of the DFD operation corresponding to the second defocus distance as illustrated in Equation 3, using the first similarity ($|\widehat{F_G} K_1(1) - F_1|^2$) corresponding to the square of the result of subtracting the characteristic F1 of the first region from a value from multiplying the estimated image data ($\widehat{F_G}$) and the degree K1(1) of spreading of the first point corresponding to the second defocus distance and the second similarity ($|\widehat{F_G} K_2(2) - F_2|^2$) corresponding to the square of the result of subtracting the characteristic F2 of the second region from a value from multiplying the estimated image data ($\widehat{F_G}$) and the degree K2(1) of spreading of the second point corresponding to the second defocus distance. When the cost (Cost(1)) of the DFD operation corresponding to the first defocus distance is less than the cost (Cost(2)) of the DFD operation corresponding to the second defocus distance, the processor 560 may determine the depth information of the specified object, using the first defocus distance. According to an embodiment, the processor 560 may generate depth information about the one or more external objects including the specified object using the selected depth information (some depth information) as the depth information about the specified object. The processor 560 may store the generated depth information in the memory 550.

According to embodiments of the disclosure, in the case where the first image and the second image are focused on different objects among one or more external objects, or the like, the processor 560 may identify the third image obtained using the first camera 510 and may select some depth information among the pieces of depth information by at least using a degree of spreading of a point, which corresponds to the specified object included in the first image, from among a plurality of degrees of spreading of a first point corresponding to the first camera 510 and a degree of spreading of a point, which corresponds to the specified object included in the third image, from among the plurality of degrees of spreading of the first point corresponding to the first camera 510. The third image may be an image obtained before the first image is obtained. Alternatively, the third image may be an image obtained after the first image is obtained.

The processor 560 may identify defocus distance 'δ' between the first image and the third image and may identify the degree of spreading of a point corresponding to the specified object included in the first image and the degree of spreading of a point corresponding to the specified object included in the third image, using the plurality degrees of spreading of a point, which are spaced apart from each other by the identified defocus distance, from among the plurality degrees of spreading of a point. For example, the processor 560 may extract a third region including a specified object among the whole region of the first image and may identify the characteristic F3 of the extracted third region. For example, the characteristic F3 of the third region may be the data obtained by converting the image of the third region into the frequency domain. The processor 560 may extract a fourth region including a specified object among the whole region of the third image and may identify the characteristic F4 of the extracted fourth region. For example, the characteristic F4 of the fourth region may be the data obtained by converting the image of the fourth region into the frequency domain.

The processor 560 may estimate unblurred image data F0 as illustrated in Equation 4, using the d-th degree K1(d) of spreading of a point (d, 1≤d≤n, 'n' corresponds to the number of movable locations of the first lens part 510_1) among a plurality of degrees of spreading of the first point, the (d+δ)-th degree K1(d+δ) of spreading of a point among a plurality of degrees of spreading of the first point, the characteristic F3 of the third region, and the characteristic F4 of the fourth region. The 'δ' may be the difference in the movement amount of the first lens part 510_1 between the location of the first lens part 510_1 at a point in time when the third image is obtained and the location of the first lens part 510_1 at a point in time when the first image is obtained.

$$F_0 = \frac{F_3 K_1(d) + F_4 K_1(d+\delta)}{|K_1(d)|^2 + |K_1(d+\delta)|^2} \quad \text{Equation 4}$$

The processor 560 may identify the first similarity ($|F_0K_1(d)-F_3|^2$) between the d-th degree K1(d) of spreading of a point among the plurality of degrees of spreading of a point and the characteristic F3 of the specified object included in the first image and the second similarity ($|F_0K_1(d+\delta)-F_4|^2$) between the (d+δ)-th degree of spreading of a point among the plurality of degrees of spreading of the first point and the characteristic F4 of the specified object included in the third image and may calculate the cost (Cost(d)) of the DFD operation by summing the first similarity and the second similarity as illustrated in Equation 5.

$$\text{Cost}(d) = |F_0 K_1(d) - F_3|^2 + |F_0 K_1(d) - F_4|^2 \quad \text{Equation 5}$$

The processor 560 may identify the defocus distance of the degree of spreading of a point corresponding to the order, in which the calculated cost is lowest, and may determine the depth information about the specified object by using the identified defocus distance (the distance to the focus location).

Accordingly, the electronic device 500 includes the first camera 510 and the second camera 520. However, alternatively, the electronic device 500 may obtain a first image and a second image using the first camera 510 and the second camera 520 which are independent of the electronic device 500, and may calculate the depth information using the phase difference between the first image and the second image and the degree of spreading of a point of each of the first image and the second image.

According to the above-described embodiment, the processor 560 may generate depth information by performing DFD operation on a region (a region including the subject with a high frequency or a repeated pattern) in which it is difficult to calculate depth information using a stereo matching method in the first image and the second image. The processor 560 may increase the accuracy of the depth information calculation based on the phase difference value.

Figure 6:
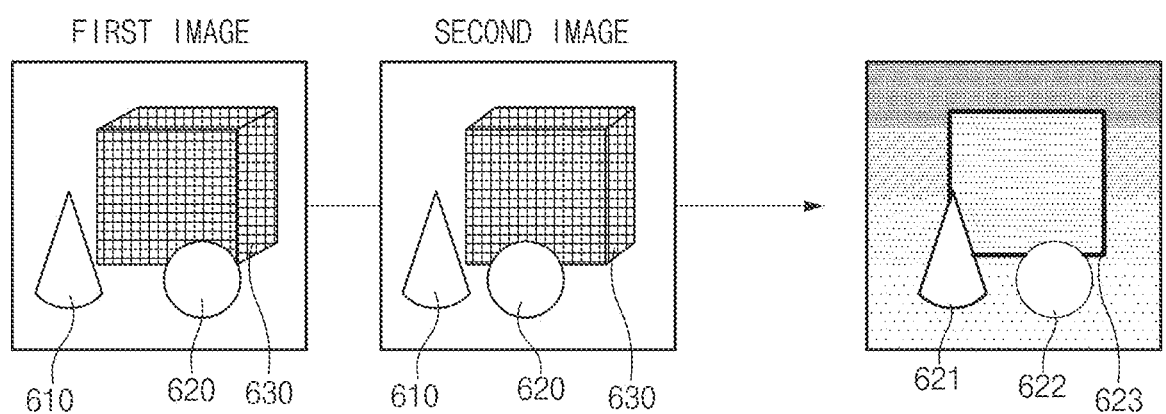
FIG. 6 is a view for describing a method of calculating a depth map according to an embodiment of the disclosure.

FIG. 6 is a view for describing a method of calculating a depth map according to an embodiment of the disclosure.

Referring to FIG. 6, each of a first image and a second image may include a first external object 610, a second external object 620, and a third external object 630, used in forming the image of a first external object 621, a second external object 622, and a third external object 623. However, the locations of the first external object 610, the second external object 620, and the third external object 630 in the first image may be different from the locations of the first external object 610, the second external object 620, and the third external object 630 in the second image.

According to an embodiment, a processor (e.g., 560 of FIG. 5) may extract at least part (hereinafter, referred to as a 'first region') of the region including the first external object 610, at least part (hereinafter, referred to as a 'second region') of the region including the second external object 620, and at least part (hereinafter, referred to as a 'third region') of the region including the third external object 630, from the first image. The processor 560 may extract at least part (hereinafter, referred to as a 'fourth region') of the region including the first external object 610, at least part (hereinafter, referred to as a 'fifth region') of the region including the second external object 620, and at least part (hereinafter, referred to as a 'sixth region') of the region including the third external object 630, from the second image. The processor 560 may calculate the phase difference between the first region and the fourth region using the stereo matching method. The processor 560 may calculate the phase difference between the second region and the fifth region by applying the stereo matching method. The processor 560 may calculate the phase difference between the third region and the sixth region by applying the stereo matching method.

Because the first external object 610 and the second external object 620 do not include the repeated pattern, the depth information may be calculated based on the phase difference calculated from the first region and the fourth region. Furthermore, the depth information may be calculated based on the phase difference calculated from the second region and the fifth region.

However, because the third external object 630 includes the repeated pattern, the depth information calculated based on the third region and the sixth region may include pieces of depth information. In this case, as described above, the processor 560 may determine a piece of depth information among the pieces of depth information by performing DFD operation on the third region and the sixth region.

As noted above, the electronic device may include the first camera disposed on one surface of the electronic device, the second camera disposed on the one surface while being spaced apart from the first camera by a specified interval, and the at least one processor. The processor may be configured to obtain a first image of one or more external objects using the first camera, obtain a second image of the one or more external objects using the second camera, identify a specified object in which pieces of depth information are generated from among the one or more external objects included in the first image and the second image based on phase difference comparison between the first image and the second image, select depth information about the specified object among the pieces of depth information based on a degree of spreading of a point corresponding to the specified object included in at least one of the first image and the second image, and generate depth information about the one or more external objects including the specified object using the selected depth information.

The processor may be further configured to select some depth information of the pieces of depth information by at least using a degree of spreading of a point, which corresponds to the specified object included in the first image, from among a plurality of degrees of spreading of a first point corresponding to the first camera, and a degree of spreading of a point, which corresponds to the specified object included in the second image, from among a plurality of degrees of spreading of a second point corresponding to the second camera, and generate the depth information about the one or more external objects using the selected some depth information as the depth information about the specified object.

The processor may be further configured to identify first similarity between the plurality of degrees of spreading of the first point and characteristics of the specified object included in the first image and second similarity between the plurality of degrees of spreading of the second point and characteristics of the specified object included in the second image, and select the some depth information among the pieces of depth information using the first similarity and the second similarity.

The processor may be further configured to select the some depth information among the pieces of depth information using a defocus distance corresponding to a degree of spreading of the first point, in which sum of the first similarity and the second similarity is smallest, from among the plurality of degrees of spreading of the first point, or a degree of spreading of the second point, in which sum of the first similarity and the second similarity is smallest, from among the plurality of degrees of spreading of the second point.

In the identifying of the first similarity and the second similarity, the processor may be further configured to use a degree of spreading of the first point and a degree of spreading of the second point, which have the same defocus distance, from among the plurality of degrees of spreading of the first point and the plurality of degrees of spreading of the second point.

The plurality of degrees of spreading of the first point or the plurality of degrees of spreading of the second point may include depth relationship information about change in degree of spreading of a point according to change of at least part of a distance between the electronic device and the one or more external objects, and the processor may be further configured to select the some depth information further using the depth relationship information.

The processor may be further configured to obtain a third image by using the first camera, to select some depth information of the pieces of depth information using a degree of spreading of a point corresponding to the specified object included in the first image and a degree of spreading of a point corresponding to the specified object included in the third image among a plurality of degrees of spreading of a point corresponding to the first camera, and generate the depth information about the one or more external objects using the selected some depth information as the depth information about the specified object.

The processor may be further configured to identify the degree of spreading of the point corresponding to the specified object included in the first image and the degree of spreading of the point corresponding to the specified object included in the third image using degrees of spreading of the point, which are spaced apart from each other by a defocus distance between the first image and the third image, from among the plurality degrees of spreading of the point, and select the some depth information among the pieces of depth information using a defocus distance of the degree of spreading of the point corresponding to the specified object included in the first image.

The third image may be obtained before the first image is obtained.

In the above-described embodiments, the generation of depth information using the first and second images obtained using the first and second cameras (e.g., 510 and 520) may be described. The depth information may also be generated using a single camera capable of obtaining the first and second images with different point spread functions. The camera may include two photo diodes per pixel.

Figure 7:
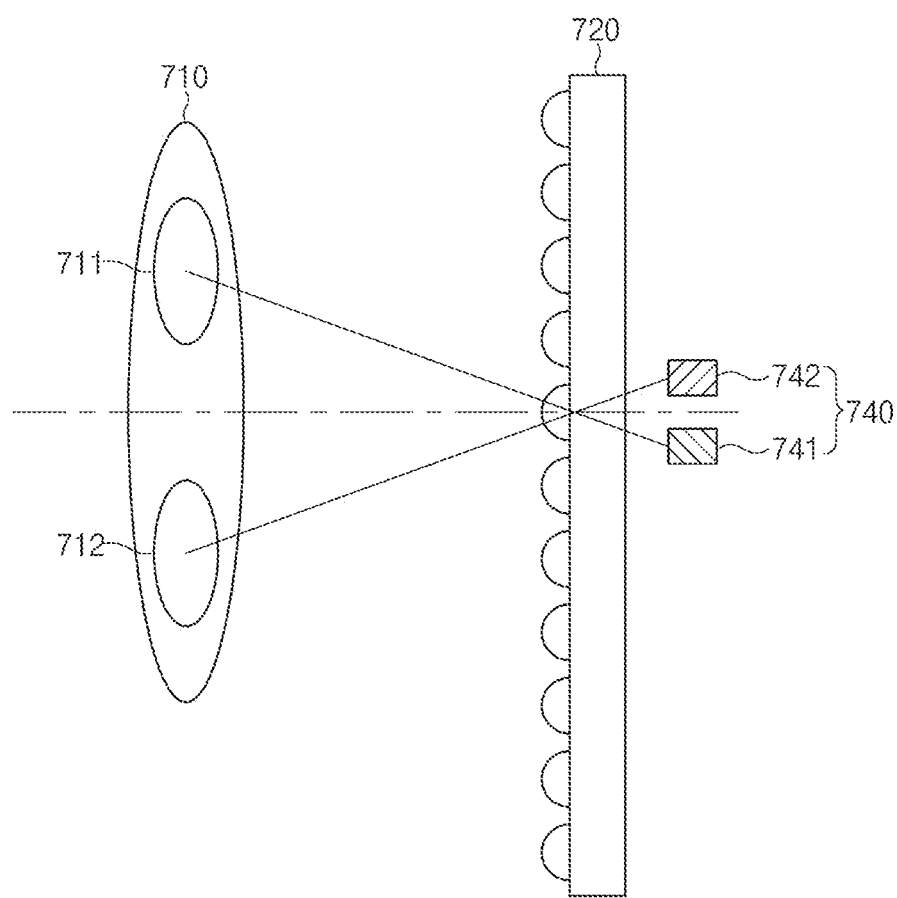
FIG. 7 is a structural diagram of each pixel of a dual pixel camera according to an embodiment of the disclosure.

Hereinafter, a structure of a dual pixel camera having a dual light receiving element per pixel will be described with reference to FIG. 7. FIG. 7 is a structural diagram of each pixel of a dual pixel camera according to an embodiment of the disclosure.

Referring to FIG. 7, a camera may include a lens part 710, a micro lens 720, and an image sensor 740. In an embodiment, a part of the components may be omitted or an additional component may be further included. In an embodiment, some components may be combined to form one entity, which may identically perform functions of some components before the combination.

An incident light passing through the lens part 710 may pass through the micro lens part 720 and then may be incident on a first group pixel 741 and a second group pixel 742.

The micro lens 720 may direct the light incident from a part (e.g., right side) 711 of the lens part 710 to the first group pixel 741 and may direct the light incident from the other part (left side) 712 of the lens part 710 to the second group pixel 742.

Each pixel of the image sensor 740 may include the first group pixel 741 and the second group pixel 742. The first group pixel 741 may obtain light that is incident on the right side (e.g., 711) of the lens part 710 and then passes through the left side of the micro lens 720. The second group pixel 742 may obtain light that is incident on another part (e.g., 712) of the lens part 710 and then passes through the right side of the micro lens 720.

The first image may be imaged on the first group pixels 741 of the image sensor 740 by the above-described structure, and the second image may be imaged on the second group pixels 742 of the image sensor 740 by the above-described structure. The point spread function of each of the first image and the second image may be different from each other.

Figure 8:
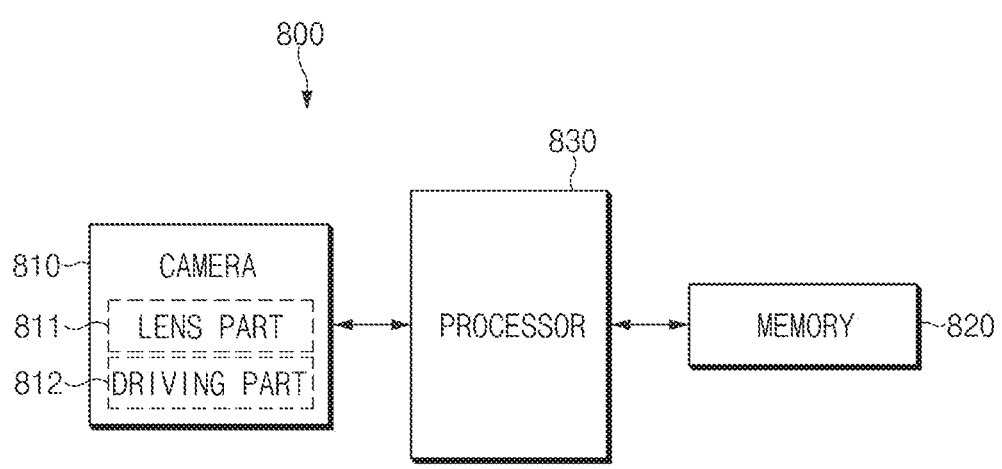
FIG. 8 is a block diagram of an electronic device according to an embodiment of the disclosure.

FIG. 8 is a block diagram of an electronic device according to an embodiment of the disclosure.

Referring to FIG. 8, an electronic device 800 may include a camera 810, a memory 820, and a processor 830. In an embodiment, a part of the components may be omitted or an additional component may be further included. In an embodiment, some components may be combined to form one entity, which may identically perform functions of some components before the combination.

The camera 810 may be a dual pixel camera having a first group of pixels (e.g., 741 of FIG. 7) and a second group of pixels (e.g., 742 of FIG. 7). The camera 810 may be a camera (e.g., a dual photo diode (2PD) camera) that includes an image sensor capable of obtaining image data including a phase difference from one pixel including the region having the characteristics of the first group and the region having the characteristics of the second group. The camera 810 may obtain a first image and a second image under the control of the processor 830. The camera 810 may include a driving part 812 and a lens part 811. The driving part 812 may adjust the location of the lens part 811 by a movement amount, under the control of the ISP or the processor 830.

The memory 820 may store instructions or data associated with at least one other component(s) of the electronic device 800. The memory 820 may be a volatile memory (e.g., a RAM or the like), a nonvolatile memory (e.g., a ROM, a flash memory, or the like), or a combination thereof. According to an embodiment, the memory 820 may store phase difference reference data for generating depth information using a phase difference (or disparity). The memory 820 may also store the first point spread function corresponding to the first group of pixels, and the second point spread function corresponding to the second group of pixels, for each location of the lens part 811. The first point spread function may be a function associated with a plurality of degrees of spreading of the first point corresponding to the first group of pixels of the camera 810. For example, the plurality of degrees of spreading of the first point may include the degree of spreading of a point obtained from the image that is imaged by the first group of pixels of the camera 810 while the distance of the external object (e.g., the light source) is fixed to one side of the electronic device 800 and the location of the lens part 811 of the camera 810 is moved along the optical axis from a location closest to the external object to a location farthest from the external object.

As another example, the plurality of degrees of spreading of the first point may include the degree of spreading of a point obtained from the image that is imaged on the first group of pixels of the camera 810 while the location of the lens part 811 of the camera 810 is fixed and the distance of the external object (e.g., the light source) to one side of the electronic device 800 is changed.

As another example, the plurality of degrees of spreading of the first point may be obtained as the distance of the external object to one side of the electronic device 800 and the location of the lens part 811 of the camera 810 are fixed and a part of the characteristics of the optical system of the camera 810 are changed. The second point spread function may be a function associated with a plurality of degrees of spreading of the second point corresponding to the second group of pixels of the camera 810. For example, the plurality of degrees of spreading of the second point may include the degree of spreading of a point obtained from the image that is imaged by the second group of pixels of the camera 810 while the distance of the external object (e.g., the light source) is fixed to one side of the electronic device 800 and the location of the lens part 811 is moved along the optical axis from a location closest to the external object to a location farthest from the external object.

As another example, the plurality of degrees of spreading of the second point may include the degree of spreading of a point obtained from the image that is imaged on the second group of pixels of the camera 810 while the location of the lens part of the camera 810 is fixed and the distance of the external object (e.g., the light source) to one side of the electronic device 800 is changed.

As another example, the plurality of degrees of spreading of the first point may be obtained as the distance of the external object to one side of the electronic device 800 and the location of the lens part 811 of the camera 810 are fixed and a part of the characteristics of the optical system of the camera 810 are changed.

The processor 830 may perform data processing or an operation associated with a control and/or a communication of at least one other component(s) of the electronic device 800 by using instructions stored in the memory 820. For example, the processor 830 may include at least one of a CPU, a GPU, a microprocessor, an AP, an ASIC, a FPGA, or an ISP, and may have a plurality of cores.

According to an embodiment, the processor 830 may obtain the first image of one or more external objects using the first group of pixels of the camera 810, and may obtain the second image of one or more external objects using a second group of pixels of the camera.

According to an embodiment, the processor 830 may identify a phase difference of at least some objects among one or more objects commonly included in the first image and second image based on the phase difference comparison between the first image and the second image, and may generate depth information corresponding to the phase difference based on phase difference reference data. For example, the processor 830 may calculate the correlation operation cost between the estimated locations of the at least some objects of the first image and the estimated locations of the at least some objects of the second image corresponding to the at least some objects using the specified stereo matching method, may calculate the phase difference between the locations of at least some objects among one or more external objects of the first image and the locations of at least some objects, in each of which the calculated correlation operation cost is the minimum value, and may generate depth information about at least some objects from the calculated phase difference based on the phase difference reference data.

According to an embodiment, when the first image and the second image are focused on the same object among one or more external objects and a specified object, in which pieces of depth information are generated, among the one or more external objects is present, the processor 830 may select a part of depth information about a specified object among the pieces of depth information by at least using the degree of spreading of a point, which corresponds to a specified object included in the first image, from among a plurality of degrees of spreading of the first point, and degrees of spreading of a point, which corresponds to a specified object included in the second image, from among a plurality of degrees of spreading of a second point.

For example, the processor 830 may identify first similarity between the plurality of degrees of spreading of the first point and the characteristics of the specified object included in the first image and second similarity between the plurality of degrees of spreading of the second point and the characteristics of the specified object included in the second image, and may select the part of depth information among the pieces of depth information by using the first similarity and the second similarity. Referring to Equation 2 and Equation 3 described above, the processor 830 may extract a first region including a specified object among the whole region of the first image and may identify the characteristic F1 of the extracted first region. For example, the characteristic F1 of the first region may be the data obtained by converting the image of the first region into the frequency domain. The processor 830 may extract a second region including a specified object among the whole region of the second image and may identify the characteristic F2 of the extracted second region. The processor 830 may estimate unblurred image data ($\widehat{F_G}$) as illustrated in Equation 2, using the d-th degree K1(d) of spreading of the first point, which has the same defocus distance (d, 1≤d≤n, 'n' corresponds to the number of movable locations of the lens part included in the camera 810) among a plurality of degrees of spreading of the first point and a plurality of degrees of spreading of a second point, the d-th degree K2(d) of spreading of the second point having the same defocus distance, the characteristic F1 of the first region, and the characteristic F2 of the second region. The processor 830 may calculate the cost (Cost(d)) of the DFD operation as illustrated in Equation 3, using the first similarity ($|\widehat{F_G} K_2(d) - F_1|^2$) corresponding to the square of the result of subtracting the characteristic F1 of the first region from a value from multiplying the estimated image data ($\widehat{F_G}$) and the d-th degree K1(d) of spreading of the first point and the second similarity ($\widehat{F_G} K_2(d) - F_2|^2$) corresponding to the square of the result of subtracting the characteristic F2 of the second region from a value from multiplying the estimated image data ($\widetilde{F_8}$) and the d-th degree K2(d) of spreading of the second point. The processor 830 may identify the defocus distance of the degree of spreading of a point corresponding to the order, in which the calculated cost is lowest, and may determine the depth information about the specified object by using the identified defocus distance (the distance to the focus location).

According to embodiments of the disclosure, in the case where the first image and the second image are focused on different objects among one or more external objects, or the like, the processor 830 may identify the third image obtained using the camera 810 and may select some depth information among the pieces of depth information by at least using a degree of spreading of a point, which corresponds to the specified object included in the first image, from among a plurality of degrees of spreading of a first point corresponding to the camera 810 and a degree of spreading of a point, which corresponds to the specified object included in the third image, from among the plurality of degrees of spreading of the first point corresponding to the camera 810. The third image may be an image obtained before the first image is obtained. Alternatively, the third image may be an image obtained after the first image is obtained.

The processor 830 may identify defocus distance (e.g., difference in lens movement amount='δ') between the first image and the third image and may identify the degree of spreading of a point corresponding to the specified object included in the first image and the degree of spreading of a point corresponding to the specified object included in the third image, using the plurality degrees of spreading of a point, which are spaced apart from each other by the identified defocus distance, from among the plurality degrees of spreading of a point. For example, the processor 830 may extract a third region including a specified object among the whole region of the first image and may identify the characteristic F3 of the extracted third region. For example, the characteristic F3 of the third region may be the data obtained by converting the image of the third region into the frequency domain. The processor 830 may extract a fourth region including a specified object among the whole region of the third image and may identify the characteristic F4 of the extracted fourth region. For example, the characteristic F4 of the fourth region may be the data obtained by converting the image of the fourth region into the frequency domain.

The processor 830 may estimate unblurred image data F0 as illustrated in Equation 4, using the d-th degree K1(d) of spreading of a point among a plurality of degrees of spreading of the first point, the (d+δ)-th degree K1(d+δ) of spreading of a point among a plurality of degrees of spreading of the first point, the characteristic F3 of the third region, and the characteristic F4 of the fourth region. The 'δ' may be the difference in the movement amount between the location of the lens part 811 at a point in time when the third image is obtained and the location of the lens part 811 at a point in time when the first image is obtained.

The processor 830 may identify the first similarity ($|F_0 K_1(d) - F_3|^2$) between the d-th degree K(d) of spreading of a point among the plurality of degrees of spreading of a point and the characteristic F3 of the specified object included in the first image and the second similarity between the (d+δ)-th degree of spreading of a point among the plurality of degrees of spreading of the first point and the characteristic F4 of the specified object included in the third image, and may calculate the cost (Cost(d)) of the DFD operation by summing the first similarity and the second similarity as illustrated in Equation 5. The processor 830 may identify the defocus distance of the degree of spreading of a point corresponding to the order, in which the calculated cost is lowest, and may determine the depth information about the specified object by using the identified defocus distance (the distance to the focus location).

According to the above-described embodiments, the electronic device 800 including a camera supporting a 2PD may generate depth information using a phase difference method, using a left image obtained through the left photodiode pixels and a right image obtained through the right photodiode pixels. At this time, with regard to an image including a high frequency region or a region having a repeated pattern, in which it is difficult to specify depth information based on the phase difference, the electronic device 800 may calculate the depth information based on the DFD operation according to the above embodiments with respect to a high frequency region or a region having the repeated pattern. For example, with regard to a specified object having the high frequency region or the repeated pattern, in which pieces of depth information are calculated, the electronic device 800 may calculate depth information using a plurality of images obtained at different lens locations. As another example, the electronic device 800 may calculate depth information using the image data of a region corresponding to the specified object in each of the left image and the right image obtained at one lens location, the first PSF corresponding to the left photodiode and the second PSF corresponding to the right photodiode.

In an embodiment, the camera may include a first group of pixels and a second group of pixels per pixel, and the processor may be configured to obtain a first image of one or more external objects using the first group of pixels of the camera, obtain a second image of the one or more external objects using the second group of pixels of the camera, identify a specified object in which pieces of depth information are generated, from among the one or more external objects included in the first image and the second image, based on phase difference comparison between the first image and the second image, and select depth information about the specified object among the pieces of depth information based on a degree of spreading of a point of the specified object included in at least one of the first image and the second image.

The processor may be configured to select some depth information of the pieces of depth information by at least using a degree of spreading of a point, which corresponds to the specified object included in the first image, from among a plurality of degrees of spreading of a first point corresponding to the first group of pixels, and a degree of spreading of a point, which corresponds to the specified object included in the second image, from among a plurality of degrees of spreading of a second point corresponding to the second group of pixels, and generate depth information about the one or more external objects including the specified object using the selected depth information.

The processor may be further configured to identify first similarity between the plurality of degrees of spreading of the first point and characteristics of the specified object included in the first image and second similarity between the plurality of degrees of spreading of the second point and characteristics of the specified object included in the second image, and select the some depth information among the pieces of depth information using the first similarity and the second similarity.

The processor may be further configured to select the some depth information among the pieces of depth information using a defocus distance corresponding to degrees of spreading of the first point, in each of which a sum of the first similarity and the second similarity is smallest, from among the plurality of degrees of spreading of the first point, or degrees of spreading of the second point, in each of which a sum of the first similarity and the second similarity is smallest, from among the plurality of degrees of spreading of the second point.

In identifying the first similarity and the second similarity, the processor may be configured to use a degree of spreading of the first point and a degree of spreading of the second point, which have the same defocus distance, from among the plurality of degrees of spreading of the first point and the plurality of degrees of spreading of the second point.

The plurality of degrees of spreading of the first point or the plurality of degrees of spreading of the second point may further include depth relationship information about change in a degree of spreading of a point according to change of at least part of a distance between the electronic device and the one or more external objects, and the processor may be configured to select the some depth information further using the depth relationship information.

The processor may be further configured to obtain a third image by using the first camera, to select some depth information of the pieces of depth information by at least using a degree of spreading of a point, which corresponds to the specified object included in the first image, from among a plurality of degrees of spreading of a point corresponding to the first camera, and a degree of spreading of a point, which corresponds to the specified object included in the third image, and generate the depth information about the one or more external objects using the selected some depth information as the depth information about the specified object.

The processor may be further configured to identify the degree of spreading of the point corresponding to the specified object included in the first image and the degree of spreading of the point corresponding to the specified object included in the third image by at least using the plurality degrees of spreading of a point, which are spaced apart from each other by the defocus distance, from among the plurality degrees of spreading of a point based on a defocus distance between the first image and the third image, and select the some depth information among the pieces of depth information using a defocus distance between the degrees of spreading of the point corresponding to the specified object included in the first image.

The third image may be obtained before the first image is obtained.

Figure 9:
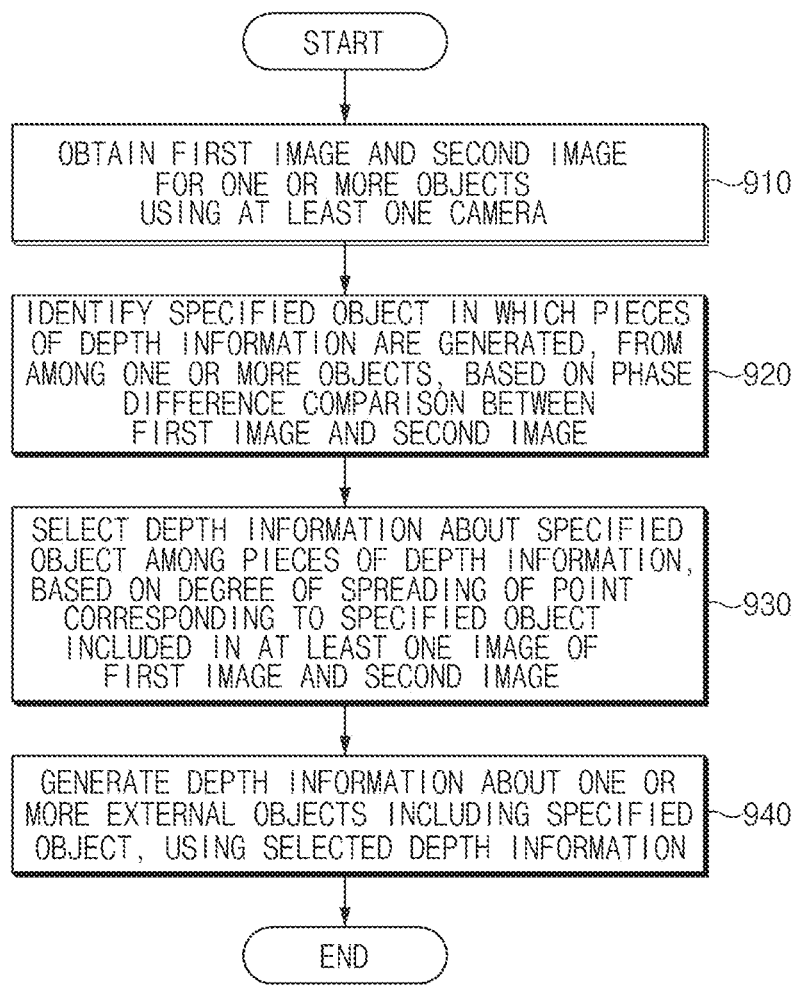
FIG. 9 is a flowchart of a method of generating depth information according to an embodiment of the disclosure.

FIG. 9 is a flowchart of a method of generating depth information according to an embodiment of the disclosure.

Referring to FIG. 9, in operation 910, a processor (e.g., 560 of FIG. 5) may obtain a first image and a second image. The processor 560 may obtain the first image and the second image for one or more objects using at least one camera. The first image and the second image may have phase differences for at least the one or more external objects. In operation 920, the processor 560 may then identify a specified object. The Processor may generate depth information about at least some objects of the one or more external objects included in the first image and the second image based on the phase difference comparison between the first image and the second image.

In operation 930, the processor 560 may select depth information about the specified object. In operation 940, the processor 560 may generate depth information about external objects. With regard to a specified object, in which pieces of depth information are generated, among at least some objects, the processor 560 may determine depth information about the first object among the pieces of depth information by at least using a plurality of degrees of spreading of a first point corresponding to the specified object of the first image, and a plurality of degrees of spreading of a second point corresponding to the specified object of the second image.

According to the above-described embodiment, the processor 560 may apply the DFD-based depth information generating method to a part of a process of generating the phase difference-based depth information, thereby improving the error of depth information generated based on phase difference due to the effect of a spatial frequency or the repeated pattern.

According to an embodiment, a depth information generating method of the electronic device may include obtaining a first image and a second image of one or more external objects using at least one camera, identifying a specified object in which pieces of depth information are generated, from among the one or more external objects included in the first image and the second image, based on phase difference comparison between the first image and the second image, selecting depth information about the specified object among the pieces of depth information based on a degree of spreading of a point corresponding to the specified object included in at least one image of the first image and the second image, and generating depth information about the one or more external objects including the specified object using the selected depth information. The first image and the second image may have at least a phase difference of the one or more external objects.

The selecting may include selecting some depth information of the pieces of depth information by at least using a degree of spreading of a point, which corresponds to the specified object included in the first image, from among a plurality of degrees of spreading of a first point corresponding to a first phase of the at least one camera, and a degree of spreading of a point, which corresponds to the specified object included in the second image, from among a plurality of degrees of spreading of a second point corresponding to a second phase of the at least one camera. The generating may include generating the depth information about the one or more external objects using the selected some depth information as the depth information about the specified object.

Figure 10:
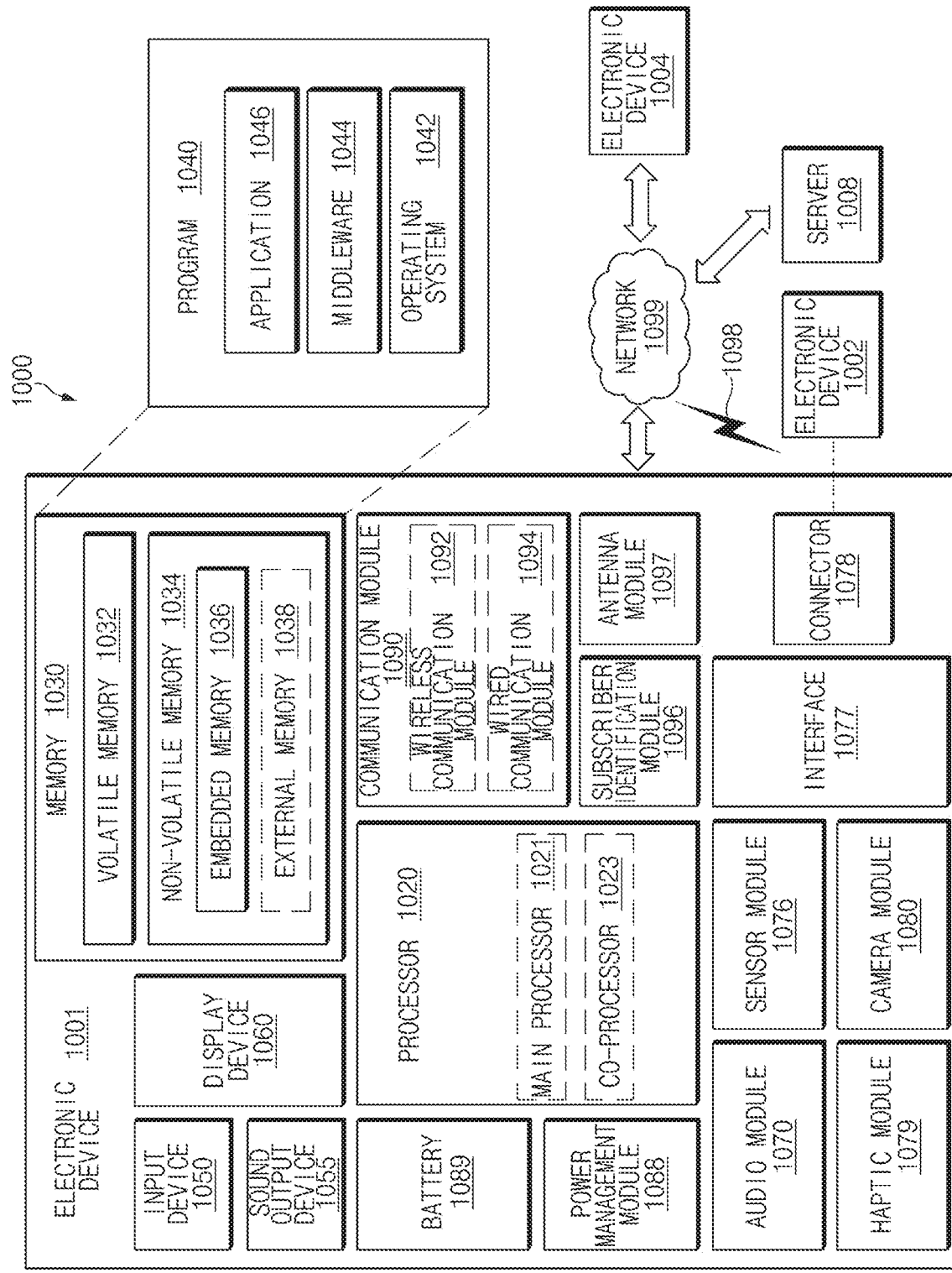
FIG. 10 is a block diagram of an electronic device in a network environment according to embodiments of the disclosure.

FIG. 10 is a block diagram illustrating an electronic device in a network environment according to embodiments of the disclosure.

Referring to FIG. 10, an electronic device 1001 in a network environment 1000 may communicate with an electronic device 1002 via a first network 1098 (e.g., a short-range wireless communication network), or an electronic device 1004 or a server 1008 via a second network 1099 (e.g., a long-range wireless communication network). According to an embodiment, the electronic device 1001 may also communicate with the electronic device 1004 via the server 1008.

According to an embodiment, the electronic device 1001 may include a processor 1020, memory 1030, an input device 1050, a sound output device 1055, a display device 1060, an audio module 1070, a sensor module 1076, an interface 1077, a haptic module 1079, a camera module 1080, a power management module 1088, a battery 1089, a communication module 1090, a subscriber identification module (SIM) 1096, or an antenna module 1097. In some embodiments, at least one (e.g., the display device 1060 or the camera module 1080) of the components may be omitted from the electronic device 1001, or one or more other components may be added in the electronic device 1001. In some embodiments, some of the components may be implemented as single integrated circuitry. For example, the sensor module 1076 (e.g., a fingerprint sensor, an iris sensor, or an illuminance sensor) may be implemented as embedded in the display device 1060 (e.g., a display).

The processor 1020 may execute, for example, software (e.g., a program 1040) to control at least one other component (e.g., a hardware or software component) of the electronic device 1001 coupled with the processor 1020, and may perform various data processing or computations. According to one embodiment, as at least part of the data processing or computation, the processor 1020 may load one or more instructions or data received from another component (e.g., the sensor module 1076 or the communication module 1090) in volatile memory 1032, process the instructions or the data stored in the volatile memory 1032, and store resulting data in non-volatile memory 1034. According to an embodiment, the processor 1020 may include a main processor 1021 (e.g., a CPU or an AP), and an auxiliary or co-processor 1023 (e.g., a GPU, an ISP, a sensor hub processor, or a communication processor (CP)) that is operable independently from, or in conjunction with, the main processor 1021. Additionally or alternatively, the auxiliary processor 1023 may be adapted to consume less power than the main processor 1021, or to be specific to a specified function. The auxiliary processor 1023 may be implemented as separate from, or as part of the main processor 1021.

The auxiliary processor 1023 may control at least some of the functions or states related to at least one component (e.g., the display device 1060, the sensor module 1076, or the communication module 1090) among the components of the electronic device 1001, instead of the main processor 1021 while the main processor 1021 is in an inactive (e.g., sleep) state, or together with the main processor 1021 while the main processor 1021 is in an active state (e.g., executing an application). According to an embodiment, the auxiliary processor 1023 (e.g., an ISP or a CP) may be implemented as part of another component (e.g., the camera module 1080 or the communication module 1090) functionally related to the auxiliary processor 1023.

The memory 1030 may store various data used by at least one component (e.g., the processor 1020 or the sensor module 1076) of the electronic device 1001. The various data may include, for example, software (e.g., the program 1040) and input data or output data for instructions related thereto. The memory 1030 may include the volatile memory 1032 or the non-volatile memory 1034. The non-volatile memory 1034 may include an internal or embedded memory 1036 or an external memory 1038.

The program 1040 may be stored in the memory 1030 as software, and may include, for example, an operating system (OS) 1042, middleware 1044, or an application 1046.

The input device 1050 may receive one or more instructions or data to be used by other components (e.g., the processor 1020) of the electronic device 1001, from the outside (e.g., a user) of the electronic device 1001. The input device 1050 may include, for example, a microphone, a mouse, or a keyboard.

The sound output device 1055 may output sound signals to the outside of the electronic device 1001. The sound output device 1055 may include, for example, a speaker or a receiver. The speaker may be used for general purposes, such as playing multimedia or playing recordings, and the receiver may be used for incoming calls and the like. According to an embodiment, the receiver may be implemented as separate from, or as part of the speaker.

The display device 1060 may visually provide information to the outside (e.g., a user) of the electronic device 1001. The display device 1060 may include, for example, a display, a hologram device, or a projector, and control circuitry to control a corresponding one of the display, hologram device, and projector. According to an embodiment, the display device 1060 may include touch circuitry adapted to detect a touch or hovering, or sensor circuitry (e.g., a pressure sensor) adapted to measure an intensity of force incurred by the touch.

The audio module 1070 may convert a sound into an electrical signal and convert an electrical signal into a sound. According to an embodiment, the audio module 1070 may obtain the sound via the input device 1050, or output the sound via the sound output device 1055 or a headphone of an external electronic device (e.g., an electronic device 1002) directly (e.g., wiredly) or wirelessly coupled with the electronic device 1001.

The sensor module 1076 may detect an operational state (e.g., power or temperature) of the electronic device 1001 or an environmental state (e.g., a state of a user) external to the electronic device 1001, and then generate an electrical signal or data value corresponding to the detected state. According to an embodiment, the sensor module 1076 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1077 may support one or more specified protocols to be used for the electronic device 1001 to be coupled with the external electronic device (e.g., the electronic device 1002) directly (e.g., wiredly) or wirelessly. According to an embodiment, the interface 1077 may include, for example, a high definition multimedia interface (HDMI), a universal serial bus (USB) interface, a secure digital (SD) card interface, or an audio interface.

A connecting terminal 1078 may include a connector via which the electronic device 1001 may be physically connected with the external electronic device (e.g., the electronic device 1002). According to an embodiment, the connecting terminal 1078 may include, for example, a HDMI connector, a USB connector, an SD card connector, or an audio connector (e.g., a headphone connector).

A haptic module 1079 may convert an electrical signal into a mechanical stimulus (e.g., a vibration or a movement) or electrical stimulus which may be recognized by a user via his tactile sensation or kinesthetic sensation. According to an embodiment, the haptic module 1079 may include, for example, a motor, a piezoelectric element, or an electric stimulator.

A camera module 1080 may capture a still image or moving images. According to an embodiment, the camera module 1080 may include one or more lenses, image sensors, ISPs, or flashes.

A power management module 1088 may manage power supplied to or consumed by the electronic device 1001. According to one embodiment, the power management module 1088 may be implemented as at least part of, for example, a power management integrated circuit (PMIC).

The battery 1089 may supply power to at least one component of the electronic device 1001. According to an embodiment, the battery 1089 may include, for example, a primary cell which is not rechargeable, a secondary cell which is rechargeable, a fuel cell, or a combination thereof.

The communication module 1090 may support establishing a direct (e.g., wired) communication channel or a wireless communication channel between the electronic device 1001 and the external electronic device (e.g., the electronic device 1002, the electronic device 1004, or the server 1008) and performing communication via the established communication channel. The communication module 1090 may include one or more CPs that are operable independently from the processor 1020 (e.g., the AP) and support a direct (e.g., wired) communication or a wireless communication. According to an embodiment, the communication module 1090 may include a wireless communication module 1092 (e.g., a cellular communication module, a short-range wireless communication module, or a GNSS communication module) or a wired communication module 1094 (e.g., a local area network (LAN) communication module or a power line communication (PLC) module). A corresponding one of these communication modules may communicate with the external electronic device via the first network 1098 (e.g., a short-range communication network, such as Bluetooth™, Wi-Fi direct, or infrared data association (IrDA)) or the second network 1099 (e.g., a long-range communication network, such as a cellular network, the Internet, or a computer network (e.g., LAN or wide area network (WAN)). These various types of communication modules may be implemented as a single component (e.g., a single chip), or may be implemented as multi-components (e.g., multi-chips) separate from each other. The wireless communication module 1092 may identify and authenticate the electronic device 1001 in a communication network, such as the first network 1098 or the second network 1099, using subscriber information (e.g., international mobile subscriber identity (IMSI)) stored in the SIM 1096.

The antenna module 1097 may transmit or receive a signal or power to or from the outside (e.g., the external electronic device) of the electronic device 1001. According to an embodiment, the antenna module 1097 may include one or more antennas and therefrom at least one antenna appropriate for a communication scheme used in the communication network, such as the first network 1098 or the second network 1099, may be selected by, for example, the communication module 1090 (e.g., the wireless communication module 1092). The signal or power may then be transmitted or received between the communication module 1090 and the external electronic device via the selected at least one antenna.

At least some of the above-described components may be coupled mutually and communicate signals (e.g., instructions or data) therebetween via an inter-peripheral communication scheme (e.g., a bus, general purpose input and output (GPIO), serial peripheral interface (SPI), or mobile industry processor interface (MIPI)).

According to an embodiment, instructions or data may be transmitted or received between the electronic device 1001 and the external electronic device 1004 via the server 1008 coupled with the second network 1099. Each of the electronic devices 1002 and 1004 may be a device of a same type as, or a different type, from the electronic device 1001. According to an embodiment, all or some of operations to be executed at the electronic device 1001 may be executed at one or more of the external electronic devices 1002, 1004, or 1008. For example, if the electronic device 1001 should perform a function or a service automatically, or in response to a request from a user or another device, the electronic device 1001, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1001. The electronic device 1001 may provide the outcome, with or without further processing of the outcome, as at least part of a reply to the request. To that end, a cloud computing, distributed computing, or client-server computing technology may be used, for example.

Figure 11:
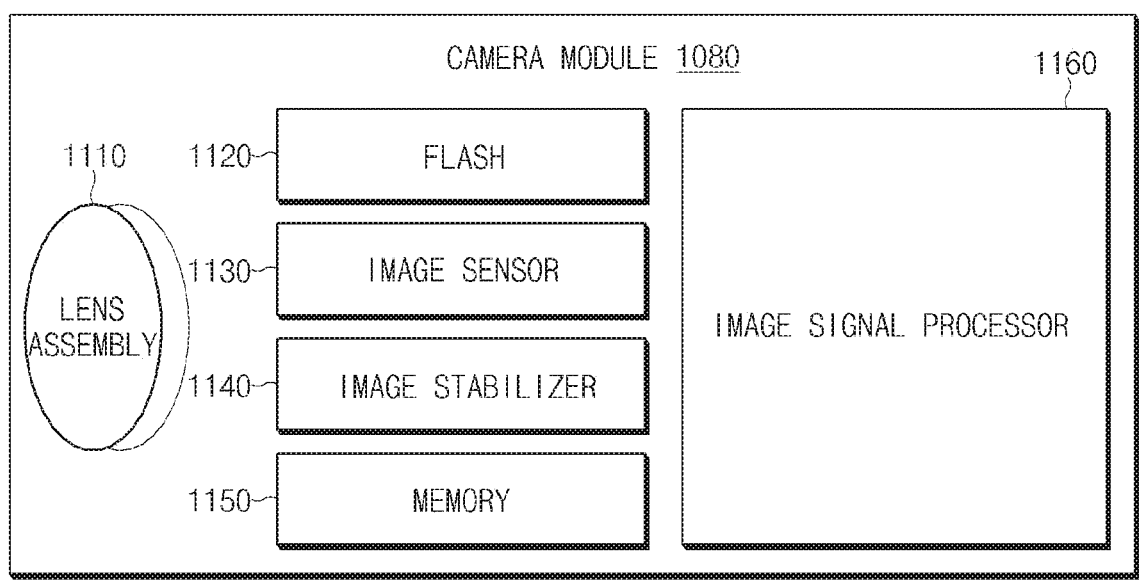
FIG. 11 is a block diagram illustrating a camera module according to embodiments of the disclosure.

FIG. 11 is a block diagram illustrating a camera module according to embodiments of the disclosure.

Referring to FIG. 11, a camera module such as the camera module 1080 may include a lens assembly 1110, a flash 1120, an image sensor 1130, an image stabilizer 1140, memory 1150 (e.g., buffer memory), or an ISP 1160. The lens assembly 1110 may collect light emitted or reflected from an object whose image is to be taken. The lens assembly 1110 may include one or more lenses. According to an embodiment, the camera module 1080 may include a plurality of lens assemblies 1110. In such a case, the camera module 1080 may form, for example, a dual camera, a 360-degree camera, or a spherical camera. Some of the plurality of lens assemblies 1110 may have the same lens attribute (e.g., view angle, focal length, auto-focusing, f number, or optical zoom), or at least one lens assembly may have one or more lens attributes different from those of another lens assembly. The lens assembly 1110 may include, for example, a wide-angle lens or a telephoto lens.

The flash 1120 may emit light that is used to reinforce light reflected from an object. According to an embodiment, the flash 1120 may include one or more LEDs (e.g., a red-green-blue (RGB) LED, a white LED, an IR LED, or an ultraviolet (UV) LED) or a xenon lamp. The image sensor 1130 may obtain an image corresponding to an object by converting light emitted or reflected from the object and transmitted via the lens assembly 1110 into an electrical signal. According to an embodiment, the image sensor 1130 may include one selected from image sensors having different attributes, such as an RGB sensor, a black-and-white (BW) sensor, an IR sensor, or a UV sensor, a plurality of image sensors having the same attribute, or a plurality of image sensors having different attributes. Each image sensor included in the image sensor 1130 may be implemented using, for example, a CCD sensor or a CMOS sensor.

The image stabilizer 1140 may move the image sensor 1130 or at least one lens included in the lens assembly 1110 in a particular direction, or control an operational attribute (e.g., adjust the read-out timing) of the image sensor 1130 in response to the movement of the camera module 1080 or the electronic device 1001 including the camera module 1080. This allows compensating for at least part of a negative effect (e.g., image blurring) by the movement on an image being captured. According to an embodiment, the image stabilizer 1140 may sense such a movement by the camera module 1080 or the electronic device 1001 using a gyro sensor (not shown) or an acceleration sensor (not shown) disposed inside or outside the camera module 1080. According to an embodiment, the image stabilizer 1140 may be implemented, for example, as an optical image stabilizer.

The memory 1150 may store, at least temporarily, at least part of an image obtained via the image sensor 1130 for a subsequent image processing task. For example, if image capturing is delayed due to shutter lag or multiple images are quickly captured, a raw image obtained (e.g., a Bayerpatterned image, a high-resolution image) may be stored in the memory 1150, and its corresponding copy image (e.g., a low-resolution image) may be previewed via the display device 1060. Thereafter, if a specified condition is met (e.g., by a user's input or system instruction), at least part of the raw image stored in the memory 1150 may be obtained and processed, for example, by the ISP 1160. According to an embodiment, the memory 1150 may be configured as at least part of the memory 1030 or as a separate memory that is operated independently from the memory 1030.

The ISP 1160 may perform one or more image processing with respect to an image obtained via the image sensor 1130 or an image stored in the memory 1150. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the ISP 1160 may perform control (e.g., exposure time control or read-out timing control) with respect to at least one (e.g., the image sensor 1130) of the components included in the camera module 1080. An image processed by the ISP 1160 may be stored back in the memory 1150 for further processing, or may be provided to an external component (e.g., the memory 1030, the display device 1060, the electronic device 1002, the electronic device 1004, or the server 1008) outside the camera module 1080. According to an embodiment, the ISP 1160 may be configured as at least part of the processor 1020, or as a separate processor that is operated independently from the processor 1020. If the ISP 1160 is configured as a separate processor from the processor 1020, at least one image processed by the ISP 1160 may be displayed, by the processor 1020, via the display device 1060 as it is or after being further processed.

According to an embodiment, the electronic device 1001 may include a plurality of camera modules 1080 having different attributes or functions. In such a case, at least one of the plurality of camera modules 1080 may form, for example, a wide-angle camera and at least another of the plurality of camera modules 1080 may form a telephoto camera. Similarly, at least one of the plurality of camera modules 1080 may form, for example, a front camera and at least another of the plurality of camera modules 1080 may form a rear camera.

As used herein, the term "module" may include a unit implemented using hardware, software, or firmware, and may interchangeably be used with other terms, for example, "logic," "logic block," "part," or "circuitry." A module may be a single integral component, or a minimum unit or part thereof, adapted to perform one or more functions. For example, according to an embodiment, the module may be implemented in a form of an ASIC.

Embodiments as set forth herein may be implemented as software (e.g., the program 1040) including one or more instructions that are stored in a storage medium (e.g., the internal or embedded memory 1036 or external memory 1038) that is readable by a machine (e.g., the electronic device 1001). For example, a processor (e.g., the processor 1020) of the machine (e.g., the electronic device 1001) may invoke at least one of the one or more instructions stored in the storage medium, and execute it with or without using one or more other components under the control of the processor. This allows the machine to be operated to perform at least one function according to the at least one instruction invoked. The one or more instructions may contain a code made by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to embodiments of the disclosure may be included and provided in a computer program product. The computer program product may be traded as a product between a seller and a buyer. The computer program product may be distributed in the form of a machine-readable storage medium (e.g., compact disc ROM (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to embodiments of the disclosure, each component (e.g., a module or a program) may include a single entity or multiple entities. According to embodiments of the disclosure, one or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to embodiments of the disclosure, operations performed by the module, the program, or another component may be carried out sequentially, in parallel, repeatedly, or heuristically, or one or more of the operations may be executed in a different order or omitted, or one or more other operations may be added.

According to embodiments of the disclosure, it may be possible to calculate depth information based on a phase difference by using a DFD operation. A variety of effects directly or indirectly understood through this disclosure may be provided.

While the disclosure has been shown and described with reference to embodiments thereof, it will be understood by those skilled in the art that various changes in form and detail may be made therein without departing from the spirit and scope of the disclosure as defined by the appended claims and their equivalents.

What is claimed is:
1. An electronic device comprising:
a first camera disposed on one surface of the electronic device;
a second camera disposed on the one surface and spaced apart from the first camera by a specified interval; and
at least one processor, wherein the at least one processor is configured to:
obtain an image using the first camera,
obtain a first image of one or more external objects using the first camera,
obtain a second image of the one or more external objects using the second camera,
obtain depth information on the one or more external objects based on a phase difference comparison between the first image and the second image, when a specified object among the one or more external objects has pieces of depth information, select depth information from among the pieces of depth information based on a degree of spreading of a point corresponding to the specified object and using a defocus distance, a degree of spreading of a point corresponding to the specified object included in the first image, and a degree of spreading of a point corresponding to the specified object included in the image from among a plurality of degrees of spreading of a point corresponding to the first camera, and generate a depth map for the one or more external objects using the selected depth information, wherein the image is obtained before the first image is obtained.

2. The electronic device of claim 1, wherein the at least one processor is further configured to:

select the depth information of the pieces of depth information by further using at least:
　a degree of spreading of a point, which corresponds to the specified object included in the first image, from among a plurality of degrees of spreading of a first point corresponding to the first camera, and
　a degree of spreading of a point, which corresponds to the specified object included in the second image, from among a plurality of degrees of spreading of a second point corresponding to the second camera.

3. The electronic device of claim 2, wherein the at least one processor is further configured to:

identify a first similarity between the plurality of degrees of spreading of the first point and characteristics of the specified object included in the first image and a second similarity between the plurality of degrees of spreading of the second point and characteristics of the specified object included in the second image, and select the depth information from among the pieces of depth information by further using the first similarity and the second similarity.

4. The electronic device of claim 3, wherein the at least one processor is further configured to:

select the depth information from among the pieces of depth information by further using the defocus distance corresponding to one of:
　a degree of spreading of the first point, in which a sum of the first similarity and the second similarity is smallest, from among the plurality of degrees of spreading of the first point, or
　a degree of spreading of the second point, in which a sum of the first similarity and the second similarity is smallest, from among the plurality of degrees of spreading of the second point.

5. The electronic device of claim 3, wherein the at least one processor is further configured to:

in the identifying of the first similarity and the second similarity, use a degree of spreading of the first point and a degree of spreading of the second point, which have a same defocus distance, from among the plurality of degrees of spreading of the first point and the plurality of degrees of spreading of the second point.

6. The electronic device of claim 2, wherein the plurality of degrees of spreading of the first point or the plurality of degrees of spreading of the second point comprise depth relationship information about change in a degree of spreading of a point according to change of at least part of a distance between the electronic device and the one or more external objects, and wherein the at least one processor is further configured to select the depth information by further using the depth relationship information.

7. The electronic device of claim 1, wherein the at least one processor is further configured to:

identify the degree of spreading of the point corresponding to the specified object included in the first image and the degree of spreading of the point corresponding to the specified object included in the third image using degrees of spreading of the point, which are spaced apart from each other by a defocus distance between the first image and the third image, from among the plurality degrees of spreading of the point, and select the depth information from among the pieces of depth information by further using a defocus distance of the degree of spreading of the point corresponding to the specified object included in the first image.

8. The electronic device of claim 1, wherein the first image comprises a plurality of external objects, wherein the second image comprises a plurality of external objects, and wherein the at least one processor is further configured to:
　extract a first region including a specified object among a whole region of the first image and identify a first characteristic of the extracted first region, wherein the first characteristic comprises data obtained by converting the image of the first region into a first frequency domain, and
　extract a second region including a specified object among a whole region of the second image and identify a second characteristic of the extracted second region, wherein the second characteristic comprises data obtained by converting the image of the second region into a second frequency domain.

9. The electronic device of claim 8, wherein the at least one processor is further configured to:

identify the specified object from the specified object of the first image and the specified object of the second image using information of the first frequency domain and information of the second frequency domain.

10. An electronic device comprising:

a camera;

a memory; and at least one processor, wherein the camera comprises a first group of pixels and a second group of pixels per pixel, wherein the at least one processor is configured to:
　obtain an image using the camera,
　obtain a first image of one or more external objects using the first group of pixels of the camera,
　obtain a second image of the one or more external objects using the second group of pixels of the camera,
　obtain depth information on the one or more external objects based on a phase difference comparison between the first image and the second image,
　when a specified object among the one or more external objects has pieces of depth information, select depth information from among the pieces of depth information based on a degree of spreading of a point of the specified object and using a defocus distance, a degree of spreading of a point, which corresponds to the specified object included in the first image, from among a plurality of degrees of spreading of a point corresponding to the camera, and a degree of spreading of a point which corresponds to the specified object included in the image, and generate a depth map for the one or more external objects using the selected depth information, and wherein the image is obtained before the first image is obtained.

11. The electronic device of claim 10, wherein the at least one processor is further configured to:

select the depth information of the pieces of depth information by further using at least:

a degree of spreading of a point, which corresponds to the specified object included in the first image, from among a plurality of degrees of spreading of a first point corresponding to the first group of pixels, and a degree of spreading of a point, which corresponds to the specified object included in the second image, from among a plurality of degrees of spreading of a second point corresponding to the second group of pixels.

12. The electronic device of claim 11, wherein the at least one processor is further configured to:

identify a first similarity between the plurality of degrees of spreading of the first point and characteristics of the specified object included in the first image and a second similarity between the plurality of degrees of spreading of the second point and characteristics of the specified object included in the second image, and select the depth information from among the pieces of depth information by further using the first similarity and the second similarity.

13. The electronic device of claim 12, wherein the at least one processor is further configured to:

select the depth information from among the pieces of depth information by further using the defocus distance corresponding to one of:

degrees of spreading of the first point, in each of which a sum of the first similarity and the second similarity is smallest, from among the plurality of degrees of spreading of the first point, or degrees of spreading of the second point, in each of which a sum of the first similarity and the second similarity is smallest, from among the plurality of degrees of spreading of the second point.

14. The electronic device of claim 12, wherein the at least one processor is further configured to:

in the identifying of the first similarity and the second similarity, use a degree of spreading of the first point and a degree of spreading of the second point, which have a same defocus distance, from among the plurality of degrees of spreading of the first point and the plurality of degrees of spreading of the second point.

15. The electronic device of claim 11, wherein the plurality of degrees of spreading of the first point or the plurality of degrees of spreading of the second point further comprise depth relationship information about change in a degree of spreading of a point according to change of at least part of a distance between the electronic device and the one or more external objects, and wherein the at least one processor is further configured to select the depth information by further using the depth relationship information.

16. The electronic device of claim 10, wherein the at least one processor is further configured to:

based on a defocus distance between the first image and the third image, identify the degree of spreading of the point corresponding to the specified object included in the first image and the degree of spreading of the point corresponding to the specified object included in the third image by using at least the plurality degrees of spreading of a point, which are spaced apart from each other by the defocus distance, from among the plurality degrees of spreading of a point, and select the depth information from among the pieces of depth information by further using a defocus distance between the degrees of spreading of the point corresponding to the specified object included in the first image.

17. A depth information generating method of an electronic device, the method comprising:

obtaining an image using a first camera of the electronic device, obtaining a first image using the first camera and a second image using a second camera of the electronic device of one or more external objects, wherein the first image and the second image have at least a phase difference of the one or more external objects;

obtaining depth information on the one or more external objects based on a phase difference comparison between the first image and the second image;

when a specified object among the one or more external objects has pieces of depth information, selecting depth information from among the pieces of depth information based on a degree of spreading of a point corresponding to the specified object and using a defocus distance, a degree of spreading of a point corresponding to the specified object included in the first image, and a degree of spreading of a point corresponding to the specified object included in the image from among a plurality of degrees of spreading of a point corresponding to the first camera; and generating a depth map for the one or more external objects using the selected depth information, wherein the image is obtained before the first image is obtained.

18. The method of claim 17, wherein the selecting comprises selecting the depth information of the pieces of depth information by further using at least:

a degree of spreading of a point, which corresponds to the specified object included in the first image, from among a plurality of degrees of spreading of a first point corresponding to a first phase of the at least one camera, and a degree of spreading of a point, which corresponds to the specified object included in the second image, from among a plurality of degrees of spreading of a second point corresponding to a second phase of the at least one camera, and wherein the generating comprises generating the depth information about the one or more external objects using the selected depth information as the depth information about the specified object.

* * * * *